United States Patent
Kim et al.

(10) Patent No.: US 12,260,822 B2
(45) Date of Patent: Mar. 25, 2025

(54) DISPLAY DEVICE INCLUDING READOUT CIRCUIT TO OUTPUT FINGERPRINT SENSING SIGNAL AND METHOD OF DRIVING THE SAME

(71) Applicant: Samsung Display Co., Ltd., Yongin-Si (KR)

(72) Inventors: Ilnam Kim, Yongin-si (KR); Hyundae Lee, Yongin-si (KR); Kangbin Jo, Yongin-si (KR); Goeun Cha, Yongin-si (KR); Heechul Hwang, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/519,078

(22) Filed: Nov. 27, 2023

(65) Prior Publication Data
US 2024/0203351 A1 Jun. 20, 2024

(30) Foreign Application Priority Data
Dec. 20, 2022 (KR) .................. 10-2022-0179313

(51) Int. Cl.
G09G 3/32 (2016.01)
G06F 3/041 (2006.01)
G06V 40/13 (2022.01)
G09G 3/3233 (2016.01)

(52) U.S. Cl.
CPC ......... *G09G 3/3233* (2013.01); *G06F 3/0412* (2013.01); *G06V 40/1318* (2022.01); *G09G 2300/0426* (2013.01); *G09G 2300/0852* (2013.01); *G09G 2310/061* (2013.01)

(58) Field of Classification Search
CPC .............................................. G09G 3/30-3291
See application file for complete search history.

(56) References Cited

U.S. PATENT DOCUMENTS

2020/0320269 A1* 10/2020 Kim ................... G06V 40/1365
2021/0117035 A1*  4/2021 Kim ................... G06V 40/1306
2021/0158751 A1*  5/2021 Cha ......................... H10K 65/00

* cited by examiner

Primary Examiner — Roy P Rabindranath
(74) Attorney, Agent, or Firm — Innovation Counsel LLP

(57) ABSTRACT

A display device is disclosed that includes a display panel, a scan driver, a panel driving circuit, and a readout circuit. The display panel includes a pixel that includes a light emitting element and a sensor that includes a light sensing element. The scan driver outputs a scan signal for driving the pixel and the sensor in response to a scan control signal. The panel driving circuit outputs the scan control signal. The readout circuit generates switching signals based on the scan control signal and outputs a fingerprint sensing signal corresponding to a sensing signal received from the sensor in response to the switching signals.

12 Claims, 14 Drawing Sheets

DISPLAY DEVICE INCLUDING READOUT CIRCUIT TO OUTPUT FINGERPRINT SENSING SIGNAL AND METHOD OF DRIVING THE SAME

CROSS-REFERENCE TO RELATED APPLICATIONS

This application claims priority under 35 U.S.C. § 119 to Korean Patent Application No. 10-2022-0179313 filed on Dec. 20, 2022, in the Korean Intellectual Property Office, the disclosures of which are incorporated by reference herein in their entireties.

BACKGROUND

The present disclosure relates to a display device, and more particularly, relates to a display device capable of detecting a fingerprint and a driving method for driving the display device.

A display device provides various functions to provide information to a user by displaying an image or communicating with the user, such as detecting a user input. In addition to a general input method such as a button, a keyboard, a mouse, and the like, the display device may employ a touch-based input method that allows a user to enter information or commands easily and intuitively.

Nowadays, a method using a fingerprint, which is a type of biometric information, has been proposed for user authentication means for such applications as online banking, product purchase, security, and the like. The demand for a display device having a fingerprint recognition function is increasing.

SUMMARY

Embodiments of the present disclosure may provide a display device capable of detecting a fingerprint and a method for driving the display device.

According to an embodiment, a display device includes a display panel including a pixel including a light emitting element and a sensor including a light sensing element, a scan driver that outputs a scan signal for driving the pixel and the sensor in response to a scan control signal, a panel driving circuit that outputs the scan control signal, and a readout circuit that generates switching signals based on the scan control signal and outputs a fingerprint sensing signal corresponding to a sensing signal received from the sensor in response to the switching signals.

In an embodiment, the readout circuit may include a switching signal generator that generates the switching signals based on the scan control signal, and a receiver that outputs the fingerprint sensing signal corresponding to the sensing signal received from the sensor in response to the switching signals.

In an embodiment, the scan control signal may include a scan start signal and a clock signal.

In an embodiment, after the scan start signal transitions from a first level to a second level, the switching signal generator may sequentially output the switching signals at an active level from a p-th pulse of the clock signal, and the p may a positive integer.

In an embodiment, the switching signals may include a first switching signal, a second switching signal, and a third switching signal. The switching signal generator may sequentially output the first switching signal, the second switching signal, and the third switching signal from the p-th pulse of the clock signal at the active level.

In an embodiment, the receiver may include a sensing circuit that integrates the sensing signal received from the sensor in response to the first switching signal, a first sampling circuit that samples an output of the sensing circuit in response to the second switching signal and outputs a first sampling signal, a second sampling circuit that samples the output of the sensing circuit in response to the third switching signal and outputs a second sampling signal, and an analog-to-digital converter that outputs a digital signal corresponding to a difference between the first sampling signal and the second sampling signal as the fingerprint sensing signal.

In an embodiment, the sensor further may further include a sensor driving circuit connected to the light sensing element and outputting the sensing signal corresponding to external light.

In an embodiment, the sensor driving circuit may include a reset transistor includes a first electrode for receiving a reset voltage, a second electrode connected to a first sensing node, and a gate electrode for receiving a reset signal, an amplification transistor including a first electrode for receiving a driving voltage, a second electrode connected to a second sensing node, and a gate electrode connected to the first sensing node, and an output transistor including a first electrode connected to the second sensing node, a second electrode connected to a readout line for outputting the sensing signal, and a gate electrode for receiving a scan signal.

In an embodiment, the pixel may further include a pixel driving circuit that drives the light emitting element in response to at least one scan signal.

In an embodiment, the pixel driving circuit may include a first transistor including a first electrode electrically connected to a first driving voltage line for receiving a first driving voltage, a second electrode electrically connected to the light emitting element, and a gate electrode, a second transistor connected between a data line and the first electrode of the first transistor and including a gate electrode for receiving a first scan signal, and a third transistor connected between the second electrode of the first transistor and the gate electrode of the first transistor and including a gate electrode for receiving a second scan signal.

In an embodiment, the scan driver may output the first scan signal and the second scan signal in response to the scan control signal.

In an embodiment, the light emitting element may be an organic light emitting diode, and the light sensing element may be an organic photodiode.

According to an embodiment, a display device includes a display panel including a pixel and a sensor, a panel driving circuit that outputs a scan control signal, a scan driver that outputs a scan signal for driving the pixel and the sensor in response to the scan control signal, and a readout circuit that generates switching signals based on the scan control signal and outputs a fingerprint sensing signal corresponding to a sensing signal received from the sensor in response to the switching signals. The pixel includes a light emitting element and a pixel driving circuit connected to the light emitting element and driving the light emitting element in response to the scan signal. The sensor includes a light sensing element and a sensor driving circuit connected to the light sensing element and outputting the sensing signal corresponding to external light in response to the scan signal.

In an embodiment, the scan control signal may include a scan start signal and a clock signal.

In an embodiment, the readout circuit may include a switching signal generator that generates the switching signals based on the scan start signal and the clock signal and a receiver that outputs the fingerprint sensing signal corresponding to the sensing signal received from the sensor in response to the switching signals.

In an embodiment, the switching signals may include a first switching signal, a second switching signal, and a third switching signal. After the scan start signal transitions from a first level to a second level, the switching signal generator sequentially may output the first switching signal, the second switching signal, and the third switching signal at an active level from a p-th pulse of the clock signal. The p may be a positive integer.

In an embodiment, the receiver may include a sensing circuit that integrates the sensing signal received from the sensor in response to the first switching signal, a first sampling circuit that samples an output of the sensing circuit in response to the second switching signal and outputs a first sampling signal, a second sampling circuit that samples the output of the sensing circuit in response to the third switching signal and outputs a second sampling signal, and an analog-to-digital converter that outputs a digital signal corresponding to a difference between the first sampling signal and the second sampling signal as the fingerprint sensing signal.

According to an embodiment, a method of driving a display device includes generating a scan control signal, generating a scan signal to be provided to a pixel and a sensor in response to the scan control signal, outputting a sensing signal from the sensor in response to the scan signal, generating switching signals in response to the scan control signal, and converting the sensing signal output from the sensor into a fingerprint sensing signal in response to the switching signals.

In an embodiment, the scan control signal may include a scan start signal and a clock signal.

In an embodiment, the generating of the switching signals in response to the scan control signal may include sequentially outputting the switching signals at an active level from a p-th pulse of the clock signal after the scan start signal transitions from a first level to a second level. The p may be a positive integer.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
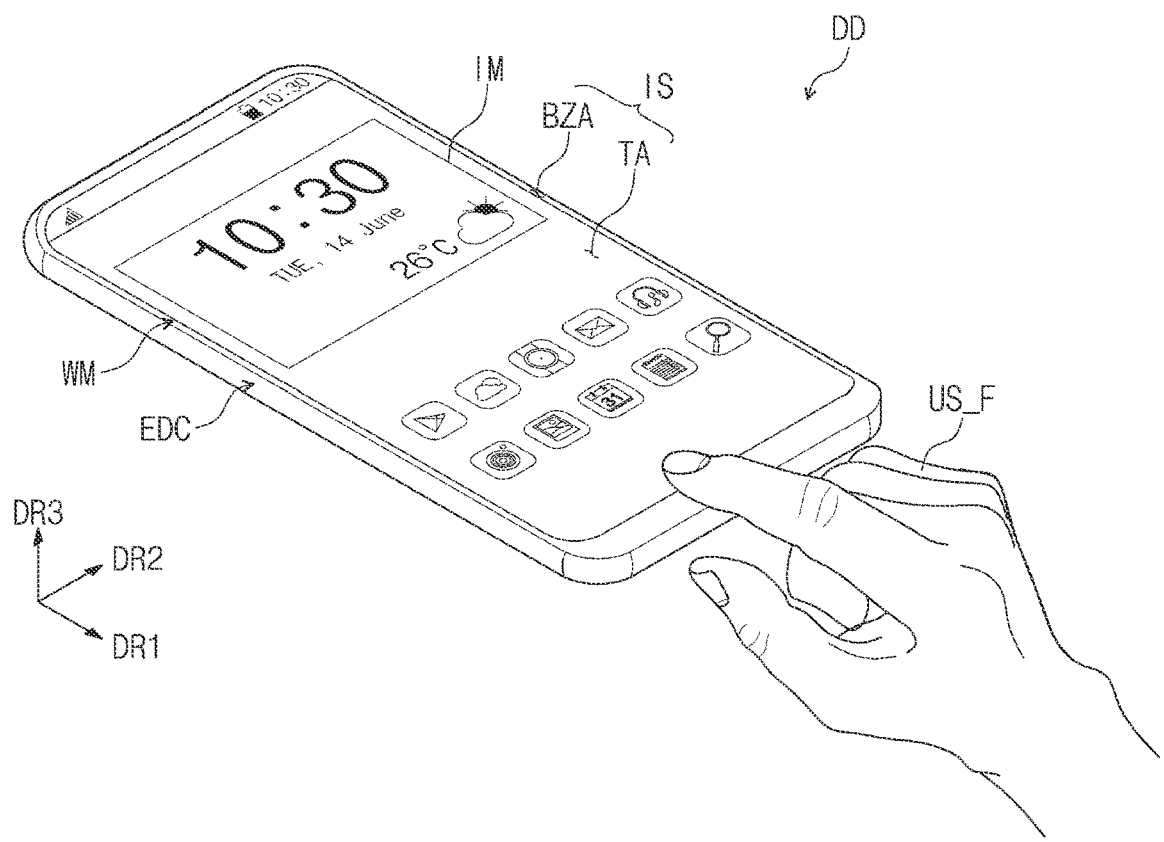
FIG. 1 is a perspective view of a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" (sometimes) are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
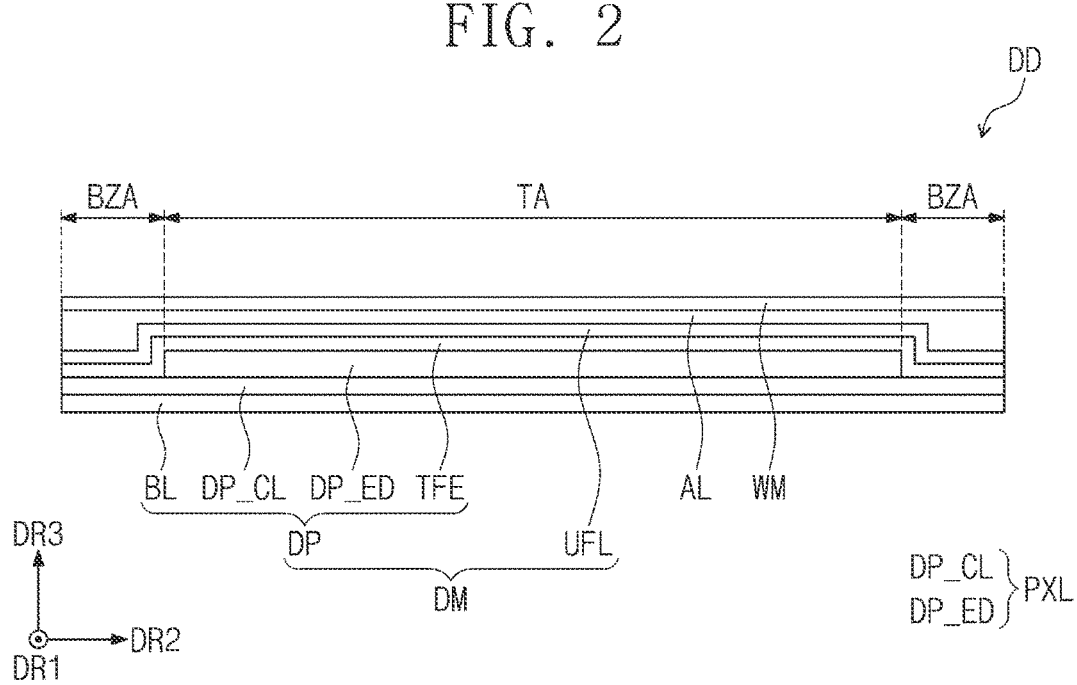
FIG. 2 is a cross-sectional view of a display device, according to an embodiment of the present disclosure.

FIG. 1 is a perspective view of a display device DD, according to an embodiment of the present disclosure. FIG. 2 is a cross-sectional view of the display device DD, according to an embodiment of the present disclosure.

Referring to FIGS. 1 and 2, a display device DD may be a device that is activated depending on an electrical signal. For example, the display device DD may be a mobile phone, a tablet PC, a car navigation system, a game console, or a wearable device, but is not limited thereto. FIG. 1 illustrates that the display device DD is a mobile phone.

In addition, although the rigid-type display device DD in a form of a bar is illustrated in FIG. 1, it is not particularly limited thereto. For example, the display device DD may be a foldable, rollable, or slideable display device.

A top surface of the display device DD may be defined as a display surface IS. The display surface IS may have a plane defined by a first direction DR1 and a second direction DR2. Images IM generated by the display device DD may be provided to a user through a display surface IS.

Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3". That is, the plane may be parallel to a plane defined by the first and second directions DR1 and DR2.

The display surface IS may be divided into a transmission area TA and a bezel area BZA. The transmission area TA may be an area in which the images IM are displayed. The user visually perceives the images IM through the transmission area TA. In an embodiment, the transmission area TA is illustrated in the shape of a rectangle whose corners are rounded. However, this is illustrated as an example. The transmission area TA may have various shapes such as a rectangle, a circle, or a square, and is not limited to an embodiment.

The bezel area BZA is adjacent to the transmission area TA. The bezel area BZA may have a predetermined color. The bezel area BZA may surround the transmission area TA. Accordingly, the shape of the transmission area TA may be substantially defined by the bezel area BZA. However, this is illustrated as an example. For example, the bezel area BZA may be disposed adjacent to only one side of the transmission area TA or may be omitted.

The display device DD may sense an external input applied from the outside. The external input may include various types of inputs that are provided from the outside of the display device DD. For example, as well as a contact by a part of a body such as the user's hand US_F, the external input may include an external input (e.g., hovering) applied when the user's hand US_F approaches the display device DD or is adjacent to the display device DD within a predetermined distance. In addition, the external input may have various types such as force, pressure, temperature, light, and the like. The external input may be provided by a separate device, for example, an active pen or a digitizer pen. Moreover, the display device DD may detect the user's biometric information provided from the outside or may measure ambient brightness.

The appearance of the display device DD may be composed of a window WM and housing EDC. For example, the window WM and the housing EDC may be coupled to each other, and other components of the display device DD, for example, the display module DM may be accommodated therein.

A front surface of the window WM defines the display surface IS of the display device DD. The window WM may include an optically transparent insulating material. For example, the window WM may include glass or plastic. The window WM may include a multi-layer structure or a single layer structure. For example, the window WM may include a plurality of plastic films bonded to each other by an adhesive or may have a glass substrate and a plastic film bonded to each other by an adhesive.

The housing EDC may include a material having relatively high rigidity. For example, the housing EDC may include glass, plastic, or metal or may include a plurality of frames or plates that are composed of a combination thereof. The housing EDC may stably protect configurations of the display device DD accommodated in the inner space from an external impact. Although not illustrated in drawings, a battery module for supplying power required for overall operations of the display device DD may be interposed between the display module DM and the housing EDC.

The display module DM may include the display panel DP and an upper functional layer UFL.

The display panel DP may be a configuration that substantially generates an image. The display panel DP may be a light emitting display panel. For example, the display panel DP may be an organic light emitting display panel, an inorganic light emitting display panel, an organic-inorganic light emitting display panel, a quantum dot display panel, a micro-LED display panel, or a nano-LED display panel. Hereinafter, it is described that the display panel DP is an organic light emitting display panel.

The display panel DP includes a base layer BL, a pixel layer PXL, and an encapsulation layer TFE. The display panel DP according to an embodiment of the present disclosure may be a flexible display panel or a rigid display panel. For example, the display panel DP may be a foldable display panel folded about a folding axis, may be a rollable display panel of which at least part is wound about a rotation axis, or may be a slideable display panel.

The base layer BL may include a synthetic resin layer. The synthetic resin layer may be a polyimide-based resin layer, and the material thereof is not particularly limited thereto. Besides, the base layer BL may include a glass substrate, a metal substrate, an organic/inorganic composite substrate, or the like.

The pixel layer PXL is disposed on the base layer BL. The pixel layer PXL may include a circuit layer DP_CL and an element layer DP_ED.

The circuit layer DP_CL is interposed between the base layer BL and the element layer DP_ED. The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic film and at least one intermediate organic film.

The circuit element may include a pixel driving circuit PDC (see FIG. 5), which is included in each of a plurality of pixels PX (see FIG. 3) for displaying an image, and a sensor driving circuit SDC (see FIG. 5), which is included in each of a plurality of sensors FX (see FIG. 3) for recognizing external information. The circuit layer DP_CL may further include signal lines connected to the pixel driving circuit PDC or the sensor driving circuit SDC.

The element layer DP_ED may include a light emitting element ED (see FIG. 5) included in each of the pixels PX and a light sensing element OPD (see FIG. 5) included in each of the sensors FX. As an example of the present disclosure, the light sensing element OPD may be a photodiode, for example, an organic photodiode. The light sensing element may be a sensor that detects or responds to light reflected by a user's fingerprint. The circuit layer DP_CL and the element layer DP_ED will be described in detail later with reference to FIG. 6.

The encapsulation layer TFE encapsulates the element layer DP_ED. The encapsulation layer TFE may include at least one organic film and at least one inorganic film. The inorganic film may include inorganic materials and may protect the element layer DP_ED from moisture/oxygen. The inorganic film may include a silicon nitride layer, a silicon oxynitride layer, a silicon oxide layer, a titanium oxide layer, an aluminum oxide layer, or the like, but not limited particularly thereto. The organic film may include organic materials and may protect the element layer DP_ED from foreign objects such as dust particles.

The upper functional layer UFL may be disposed on the display panel DP. The upper functional layer UFL may be formed on the display panel DP through sequential processes, but the present disclosure is not limited thereto.

The upper functional layer UFL may include a sensor layer for detecting coordinates of an external input, and an anti-reflection layer for reducing the reflectance of external light incident from the outside. The sensor layer may be disposed on the display panel DP. The anti-reflection layer may be disposed above the sensor layer. However, an embodiment is not limited thereto. The upper functional layer UFL may include only the sensor layer or only the anti-reflection layer.

The anti-reflection layer may include color filters, a black matrix, and a planarization layer. The color filters may have a given arrangement. For example, the color filters may be arranged in consideration of emission colors of pixels included in the display panel DP. In an embodiment, the anti-reflection layer may include a black matrix and a reflection adjustment layer. The reflection adjustment layer may selectively absorb light in a partial band among light reflected from inside the display panel DP or an electronic device, or incident light from the outside of the display panel DP or an electronic device. In an embodiment, the anti-reflection layer may be a polarizing film.

The display device DD according to an embodiment of the present disclosure may further include an adhesive layer AL. The window WM may be attached to the upper functional layer UFL by the adhesive layer AL. The adhesive layer AL may include an optical clear adhesive, an optically clear adhesive resin, or a pressure sensitive adhesive (PSA).

Figure 3:
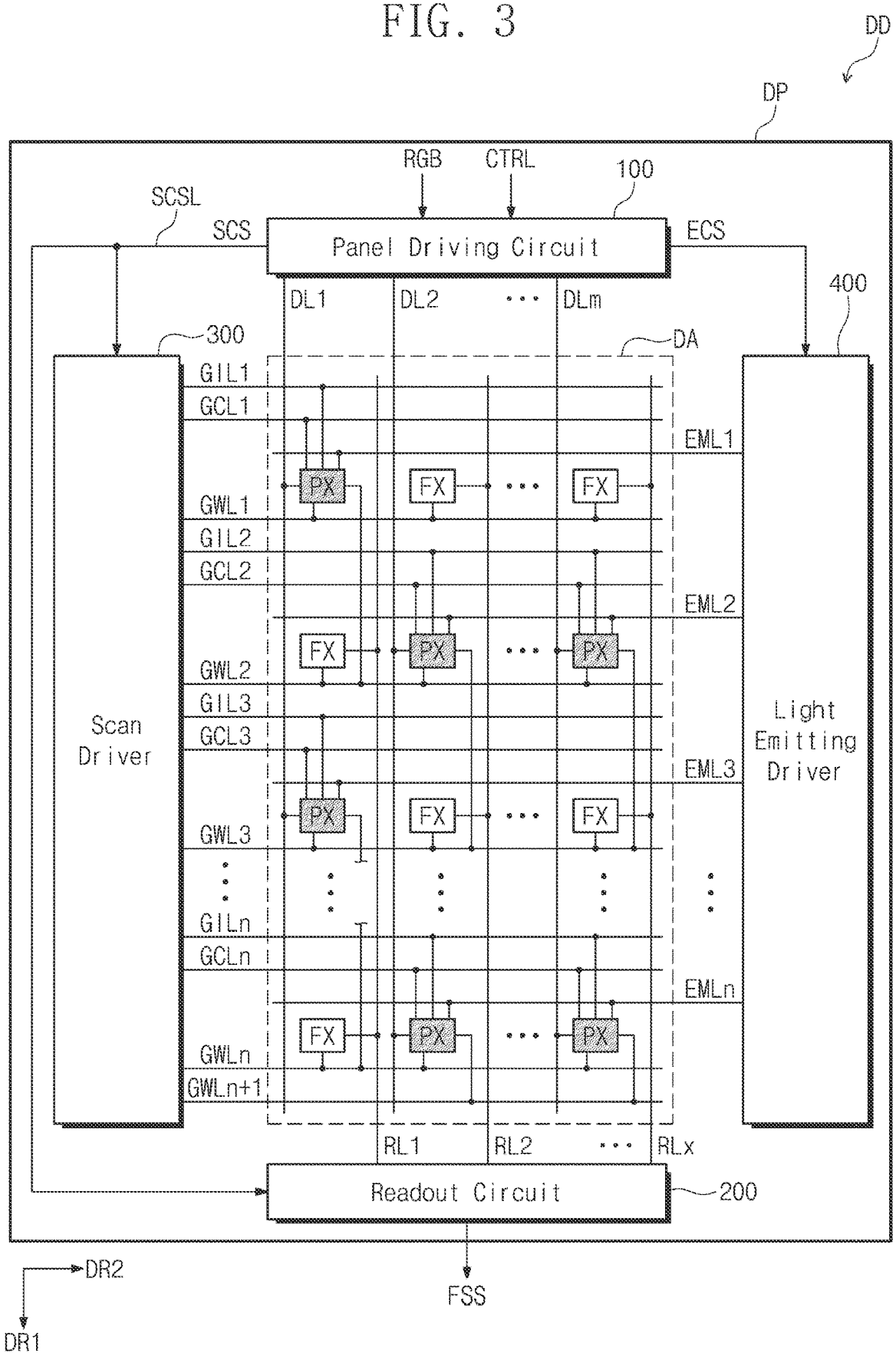
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP, a panel driving circuit 100, a readout circuit 200, the scan driver 300, and a light emitting driver 400.

The display panel DP includes scan lines GIL1 to GILn, GCL1 to GCLn, and GWL1 to GWLn+1, emission lines EML1 to EMLn, data lines DL1 to DLm, readout lines RL1 to RLx, the pixels PX, and the sensors FX.

The display panel DP may include a display area DA and a non-display area NDA. The display area DA and the non-display area NDA of the display panel DP may respectively correspond to the transmission area TA and the bezel area BZA of the display device DD shown in FIG. 1. The pixels PX and sensors FX may be disposed in the display area DA.

The panel driving circuit 100 receives an image signal RGB and a control signal CTRL. The panel driving circuit 100 may convert the image signal RGB into data signals and may provide data signals to the data lines DL1 to DLn. The data signals may be analog voltages corresponding to gray-scale values of the image signal RGB. The panel driving circuit 100 outputs a scan control signal SCS, and an emission control signal ECS.

The scan driver 300 and the light emitting driver 400 may be positioned in the non-display area NDA of the display panel DP. In an embodiment, the scan driver 300 may be arranged on a first side of the display panel DP. The scan lines GIL1 to GILn, GCL1 to GCLn, and GWL1 to GWLn+1 extend from the scan driver 300 in the second direction DR2. In an embodiment, the light emitting driver 400 may be arranged on a second side of the display panel DP. The emission lines EML1 to EMLn extend from the light emitting driver 400 in a direction opposite to the second direction DR2.

The scan lines GIL1 to GILn, GCL1 to GCLn, and GWL1 to GWLn1 and the emission lines EML1 to EMLn extend in the second direction DR2 and are arranged spaced from one another in the first direction DR1. The data lines DL1 to DLm extend from the panel driving circuit 100 in the first direction DR1 and are arranged spaced from one another in the second direction DR2.

The scan driver 300 receives the scan control signal SCS from the panel driving circuit 100 through a scan control line SCSL. The scan driver 300 may output scan signals to the scan lines GIL1 to GILn, GCL1 to GCLn, and GWL1 to GWLn+1 in response to the scan control signal SCS.

The light emitting driver 400 receives the emission control signal ECS from the panel driving circuit 100. The light emitting driver 400 may output emission signals to the emission lines EML1 to EMLn in response to the emission control signal ECS.

In the example shown in FIG. 3, the scan driver 300 and the light emitting driver 400 are arranged to face each other with the pixels PX interposed therebetween, but the present disclosure is not limited thereto. For example, the scan driver 300 and the light emitting driver 400 may be positioned adjacent to each other on one of the first side and the second side of the display panel DP. In an embodiment, the scan driver 300 and the light emitting driver 400 may be integrated into one circuit.

The plurality of pixels PX are electrically connected to the scan lines GIL1 to GILn, GCL1 to GCLn, and GWL1 to GWLn+1, the emission lines EML1 to EMLn, and the data lines DL1 to DLm. In an embodiment, each of the plurality of pixels PX may be electrically connected to three scan lines and one emission line. For example, as shown in FIG. 3, a first row of pixels may be connected to the scan lines GIL1, GCL1, GWL1, and GWL2 and the emission line EML1. Also, the n-th row of pixels may be connected to the scan lines GILn, GCLn, GWLn, and GWLn+1 and the emission line EMLn.

Each of the plurality of pixels PX includes a light emitting element ED (see FIG. 5) and a pixel driving circuit PDC (see FIG. 5) for controlling the emission of the light emitting element ED. The pixel driving circuit PDC may include one or more transistors and one or more capacitors. The scan driver 300 and the light emitting driver 400 may include transistors formed through the same process as the pixel driving circuit PDC.

Figure 5:
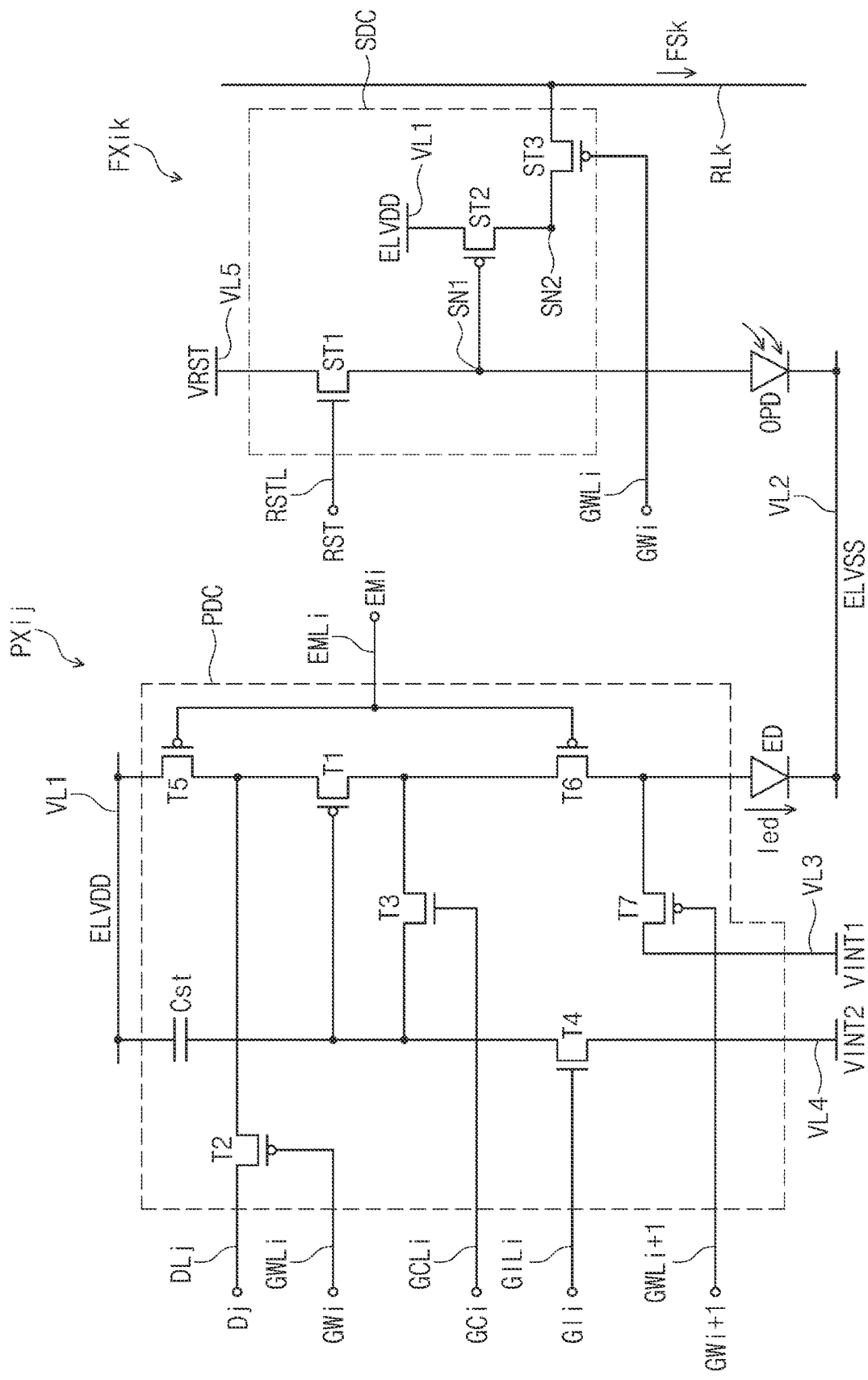
FIG. 5 is a circuit diagram of a pixel and a sensor, according to an embodiment of the present disclosure.

Each of the sensors FX includes a light sensing element OPD (see FIG. 5) and a sensor driving circuit SDC (see FIG. 5). The sensor driving circuit SDC may include one or more transistors. The sensor driving circuit SDC may include transistors formed through the same process as the pixel driving circuit PDC.

Each of the sensors FX may be connected to one corresponding scan line among the scan lines GWL1 to GWLn and one corresponding readout line among the readout lines RL1 to RLm. In an embodiment, the number of sensors FX may be the same as the number of the pixels PX. However, the present disclosure is not limited thereto. In an embodiment, the number of sensors FX positioned on the display panel DP may be less than the number of pixels PX.

The readout circuit 200 receives the scan control signal SCS from the panel driving circuit 100. The readout circuit 200 may receive a sensing signal from the readout lines RL1 to RLx and may provide a fingerprint sensing signal FSS to the outside (e.g., a main processor) in response to the scan control signal SCS.

Although not shown in drawings, the readout circuit may provide a reset signal RST (see FIG. 5) to the sensors FX. In an embodiment, the reset signal RST is a signal commonly provided to the sensors FX.

Figure 4:
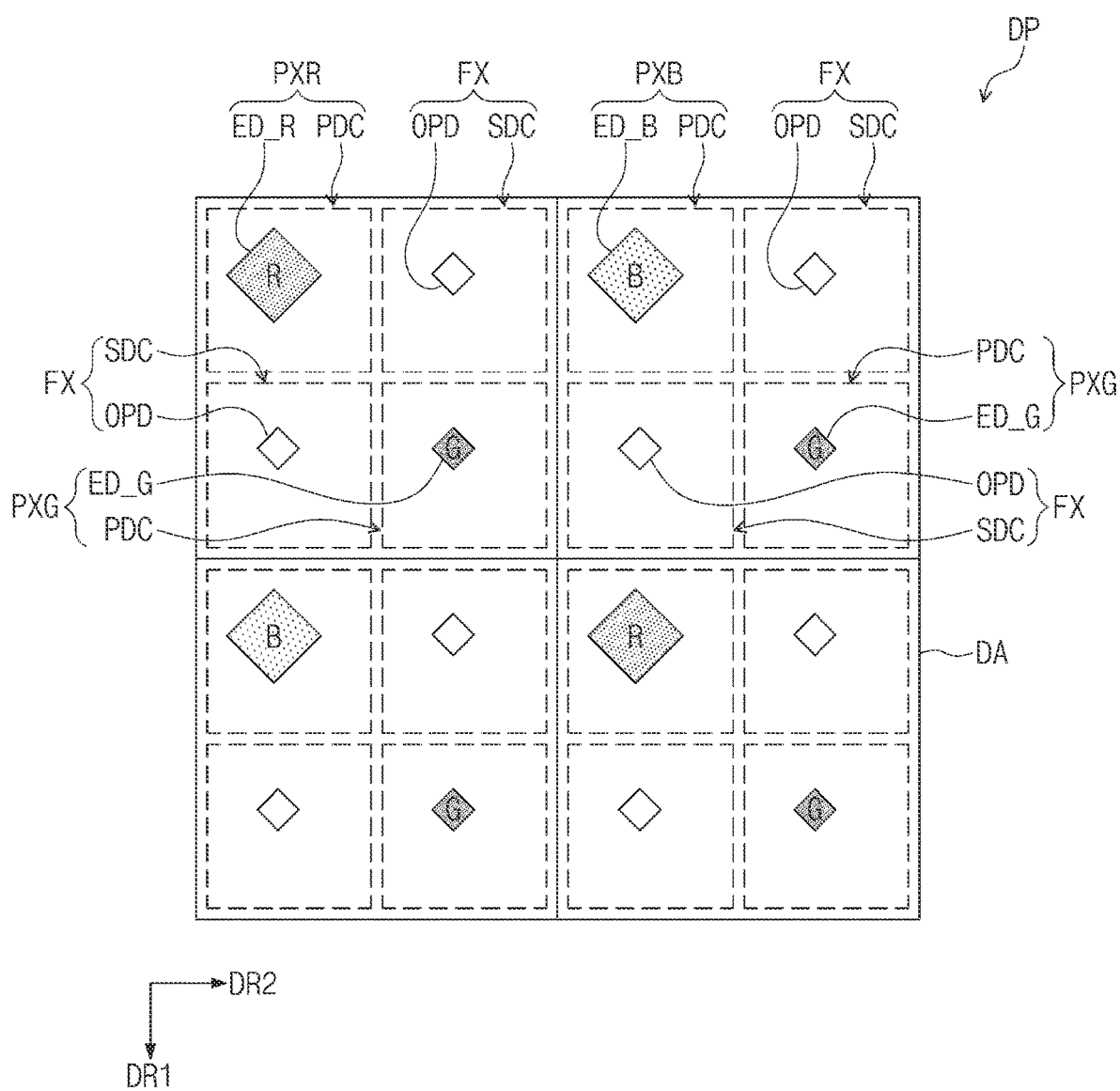
FIG. 4 is an enlarged plan view of a partial area of a display panel, according to embodiments of the present disclosure.

FIG. 4 is an enlarged plan view of a partial area of a display panel, according to embodiments of the present disclosure.

Referring to FIG. 4, pixels PXR, PXG, and PXB are arranged in the first display area DA of the display panel DP. The pixel PXR includes a light emitting element ED_R and the pixel driving circuit PDC; the pixel PXG includes a light emitting element ED_G and the pixel driving circuit PDC; and, the pixel PXB includes a light emitting element ED_B and the pixel driving circuit PDC. Each of the sensors FX includes the light sensing element OPD and the sensor driving circuit SDC.

The pixels PXR, PXG, and PXB and the sensors FX are alternately positioned in the first direction DR1 and alternately positioned in the second direction DR2. The pixels PXR, PXG, and PXB includes the first pixels PXR including a light emitting element (hereinafter referred to as a "first light emitting element ED_R") outputting light of a first color (e.g., red (R)), the second pixels PXG including a light emitting element (hereinafter referred to as a "second light emitting element ED_G") outputting light of a second color (e.g., green (G)), and the third pixels PXB including a light emitting element (hereinafter referred to as a "third light emitting element ED_B") outputting light of a third color (e.g., blue (B)).

As shown in FIG. 4, the first pixels PXR and the third pixels PXB may be alternately and repeatedly positioned in the second direction DR2 as well as the first direction DR1. The second pixels PXG may be arranged in the first direction DR1 and the second direction DR2.

Each of the sensors FX may be positioned between the first pixel PXR and the third pixel PXB to be adjacent to each other in the first and second directions DR1 and DR2. Moreover, each of the sensors FX may be positioned between the two second pixels PXG in the first and second directions DR1 and DR2.

The arrangement structure of the pixels PX and the sensors FX is not limited to that of FIG. 4 and may be variously changed.

As an example of the present disclosure, the first light emitting element ED_R may have a size greater than the second light emitting element ED_G. Moreover, the third light emitting element ED_B may have a size greater than or equal to that of the first light emitting element ED_R. The size of each of the first to third light emitting elements ED_R, ED_G, and ED_B is not limited thereto, and may be variously modified and applied. For example, in an embodiment of the present disclosure, the first to third light emitting elements ED_R, ED_G, and ED_B may have the same size as one another.

Furthermore, it is illustrated that each of the first to third light emitting elements ED_R, ED_G, and ED_B has a rectangular shape. However, an embodiment is not limited thereto. For example, a shape of each of the first to third light emitting elements ED_R, ED_G, and ED_B may be variously transformed into a polygon, a circle, an oval, and the like. As another example, the shapes of the first to third light emitting elements ED_R, ED_G, and ED_B may be different from one another. That is, the second light emitting element ED_G may have a circular shape, and the first and third light emitting elements ED_R and ED_B may have a rectangular shape.

In an embodiment, an area size occupied by the sensor driving circuit SDC may be smaller than an area size occupied by the pixel driving circuit PDC.

FIG. 5 is a circuit diagram of a pixel and a sensor, according to an embodiment of the present disclosure.

FIG. 5 illustrates one pixel PXij of the pixels PX illustrates in FIG. 4 and one sensor FXik of the sensors FX illustrates in FIG. 4. Each of the plurality of pixels PX shown in FIG. 3 may have the same circuit configuration as the equivalent circuit diagram of the pixel PXij shown in FIG. 5. Also, each of the sensors FX illustrated in FIG. 3 may have the same circuit configuration as the equivalent circuit diagram of the sensor FXik illustrated in FIG. 5.

Referring to FIG. 5, the pixel PXij includes the pixel driving circuit PDC and the at least one light emitting element ED. The light emitting element ED may be a light emitting diode. As an example of the present disclosure, the light emitting element ED may be an organic light emitting diode including an organic light emitting layer. The pixel driving circuit PDC according to an embodiment includes first to seventh transistors T1, T2, T3, T4, T5, T6, and T7 and one capacitor Cst.

The third and fourth transistors T3 and T4 of the first to seventh transistors T1 to T7 may be N-type transistors that use an oxide semiconductor as a semiconductor layer. Each of the first, second, fifth, sixth, and seventh transistors T1, T2, T5, T6, and T7 may be P-type transistors that have a low-temperature polycrystalline silicon (LTPS) semiconductor layer. However, the present disclosure is not limited thereto. In an embodiment, all the first to seventh transistors T1 to T7 may be P-type transistors. In an embodiment, all the first to seventh transistors T1 to T7 may be N-type transistors. In an embodiment, at least one of the first to seventh transistors T1 to T7 may be an N-type transistor and the others thereof may be P-type transistors. A configuration of the pixel driving circuit PDC according to an embodiment of the present disclosure is not limited to an embodiment illustrated in FIG. 5. The pixel driving circuit PDC illustrated in FIG. 5 is only an example. For example, the configuration of the pixel driving circuit PDC may be modified and implemented.

The scan lines GILi, GCLi, GWLi, and GWLi+1 may deliver scan signals Gli, GCi, GWi, and GWi+1, respectively. The emission line EMLi may deliver an emission signal EMi. The data line DLj delivers a data signal Dj. The data signal Dj may have a voltage level corresponding to the image signal RGB that is input to the display device DD (see FIG. 3). First to fourth driving voltage lines VL1, VL2, VL3, and VL4 may transfer a first driving voltage ELVDD, a second driving voltage ELVSS, a first initialization voltage VINT1, and a second initialization voltage VINT2, respectively.

The first transistor T1 includes a first electrode (i.e. a source or drain electrode) connected with the first driving voltage line VL1 through the fifth transistor T5, a second electrode (i.e. a drain or source electrode) electrically connected with an anode of the light emitting element ED through the sixth transistor T6, and a gate electrode connected with a first end of the capacitor Cst. The first transistor T1 may receive the data signal Dj through the data line DLj depending on a switching operation of the second transistor T2 and may supply a driving current to the light emitting element ED.

The second transistor T2 includes a first electrode (i.e. a source or drain electrode) connected to the data line DLj, a second electrode (i.e. a drain or source electrode) connected to the first electrode of the first transistor T1, and a gate electrode connected to the scan line GWLi. The second transistor T2 may be turned on in response to the scan signal GWi transferred through the scan line GWLi and may transfer the data signal Dj transferred through the data line DLj to the first electrode of the first transistor T1.

The third transistor T3 includes a first electrode (i.e. a source or drain electrode) connected with the gate electrode of the first transistor T1, a second electrode (i.e. a drain or source electrode) connected with the second electrode of the first transistor T1, and a gate electrode connected with the scan line GCLi. The third transistor T3 may be turned on in response to the scan signal GCi transferred through the scan line GCLi, and thus, the gate electrode and the second electrode of the first transistor T1 may be connected, that is, the first transistor T1 may be diode-connected.

The fourth transistor T4 includes a first electrode (i.e. a source or drain electrode) connected with the gate electrode of the first transistor T1, a second electrode (i.e. a drain or source electrode) connected with the fourth driving voltage line VLA through which the second initialization voltage VINT2 is transferred, and a gate electrode connected with the scan line GILi. The fourth transistor T4 may be turned on in response to the scan signal Gli transferred through the scan line GILi such that the second initialization voltage VINT2 is transferred to the gate electrode of the first transistor T1. As such, a voltage of the gate electrode of the first transistor T1 may be initialized. This operation may be referred to as an "an initialization operation".

The fifth transistor T5 includes a first electrode (i.e. a source or drain electrode) connected with the first driving voltage line VL1, a second electrode (i.e. a drain or source electrode) connected with the first electrode of the first transistor T1, and a gate electrode connected with the emission line EMLi.

The sixth transistor T6 includes a first electrode (i.e. a source or drain electrode) connected with the second electrode of the first transistor T1, a second electrode (i.e. a drain or source electrode) connected with an anode of the light emitting element ED, and a gate electrode connected to the emission line EMLi.

The fifth transistor T5 and the sixth transistor T6 may be simultaneously turned on in response to the emission control signal EMi transferred through the emission line EMLi. As such, the first driving voltage ELVDD may be compensated through the diode-connected transistor T1 so as to be supplied to the light emitting element ED.

The seventh transistor T7 includes a first electrode (i.e. a source or drain electrode) connected with the second electrode of the sixth transistor T6, a second electrode (i.e. a drain or source electrode) connected with the third driving voltage line VL3, and a gate electrode connected with the scan line GWLi+1. The seventh transistor T7 is turned on in response to the scan signal GWi+1 transferred through the scan line GWLi+1 to initialize the anode of the light emitting element ED to the first initialization voltage VINT1.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2, through which the second driving voltage ELVSS is delivered. The structure of the pixel PXij according to an embodiment is not limited to the structure illustrated in FIG. 6. For example, the number of transistors included in the one pixel PXij, the number of capacitors included in the pixel PXij, and the connection relationship between the transistors and the capacitors may be variously modified.

The sensor FXik includes the light sensing element OPD and the sensor driving circuit SDC. The light sensing element OPD may be a photodiode. As an example of the present disclosure, the light sensing element OPD may be an organic photodiode including an organic material as a photoelectric conversion layer. An anode of the light sensing element OPD may be connected with a first sensing node SN1, and a cathode thereof may be connected with the second driving voltage line VL2 transferring the second driving voltage ELVSS.

The sensor driving circuit SDC includes three transistors ST1 to ST3. The three transistors ST1 to ST3 may include the reset transistor ST1, the amplification transistor ST2, and the output transistor ST3. Some of the reset transistor ST1, the amplification transistor ST2, and the output transistor ST3 may be P-type transistors, and the other(s) thereof may be an N-type transistor. As an example of the present disclosure, the amplification transistor ST2 and the output transistor ST3 may be P-type transistors, and the reset transistor ST1 may be an N-type transistor. However, the present disclosure is not limited thereto. For example, all of the reset transistor ST1, the amplification transistor ST2, and the output transistor ST3 may be N-type transistors or P-type transistors.

The circuit configuration of the sensor driving circuit SDC according to an embodiment of the present disclosure is not limited to that illustrated in FIG. 5. The sensor driving circuit SDC illustrated in FIG. 5 is only an example, and the configuration of the sensor driving circuit SDC may be modified and implemented.

The reset transistor ST1 includes a first electrode (i.e. a source or drain electrode) connected with a reset voltage line VL5 that receives a reset voltage VRST, a second electrode (i.e. a drain or source electrode) connected with the first sensing node SN1, and a gate electrode connected with a reset line RSTL that receives the reset signal RST. The reset transistor ST1 may reset a potential of the first sensing node SN1 to the reset voltage VRST in response to the reset signal RST transferred through the reset line RSTL. As an example of the present disclosure, the reset signal RST may be a pulse signal transitioning to an active level (e.g., a high level) at the start of a reset frame. In an embodiment, the reset signal RST may be the same as one of the scan signals Gli and GCi. In an embodiment, a voltage level of the reset voltage VRST may be lower than a voltage level of the second driving voltage ELVSS.

The amplification transistor ST2 includes a first electrode (i.e. a source or drain electrode) connected with the first driving voltage line VL1 receiving the first driving voltage ELVDD, a second electrode (i.e. a drain or source electrode) connected with a second sensing node SN2, and a gate electrode connected with the first sensing node SN1. The amplification transistor ST2 may be turned on in response to a potential of the first sensing node SN1 to provide a current corresponding to the potential of the first sensing node SN1 to the second sensing node SN2.

In an embodiment, the first electrode of the amplification transistor ST2 may receive the first initialization voltage VINT1 instead of the first driving voltage ELVDD.

The output transistor ST3 includes a first electrode (i.e. a source or drain electrode) connected with the second sensing node SN2, a second electrode (i.e. a drain or source electrode) connected with a readout line RLk, and a gate electrode connected with the scan line GWLi receiving the scan signal GWi. The output transistor ST3 may output a readout signal FSk to the readout line RLk in response to the scan signal GWi.

Figure 6:
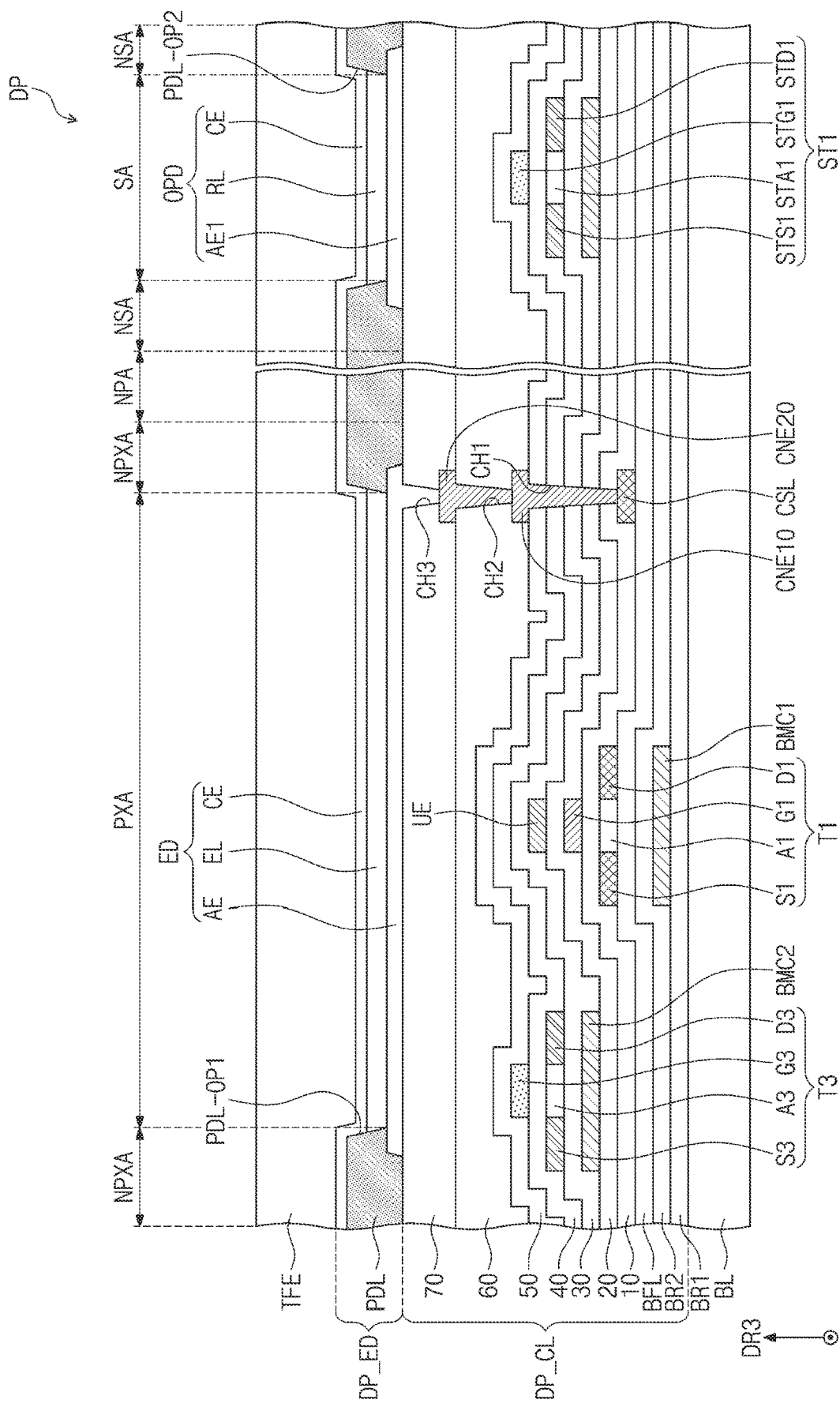
FIG. 6 is a plan view of a display panel, according to an embodiment of the present disclosure.

The circuit configuration of the sensor FXik may be variously changed without the limitation to an embodiment illustrated in FIG. 6.

FIG. 6 is a plan view of the display panel DP, according to an embodiment of the present disclosure.

Referring to FIGS. 5 and 6, the display panel DP may include the base layer BL, the circuit layer DP_CL disposed on the base layer BL, the element layer DP_ED, and the encapsulation layer TFE.

At least one inorganic layer is formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. The multi-layered inorganic layers may constitute barrier layers BR1 and BR2, or a buffer layer BFL, which will be described later. The barrier layers BR1 and BR2 and the buffer layer BFL may be disposed selectively.

The barrier layers BR1 and BR2 prevent foreign objects from being introduced from the outside. The barrier layers BR1 and BR2 may include a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In an embodiment of the present disclosure, the first back metal layer BMC1 may be omitted.

The buffer layer BFL may be disposed on the barrier layers BR1 and BR2. The buffer layer BFL improves a bonding force between the base layer BL and a semiconductor pattern or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 6 illustrates only a portion of the first semiconductor pattern disposed on the buffer layer BFL. Another portion of the first semiconductor pattern may be further disposed in another area. The first semiconductor pattern may be arranged across pixels in a specific rule. The first semiconductor pattern may have electrical characteristics different depending on whether the first semiconductor pattern is doped. The first semiconductor pattern may include a first area having high conductivity and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

The conductivity of the first area is greater than the conductivity of the second area. The first area may substantially serves as an electrode or a signal line. The second area may substantially correspond to an active area (or a channel) of a transistor. In other words, a part of the semiconductor pattern may be an active area of the transistor. Another part thereof may be a source or drain of the transistor. Another part thereof may be a connection electrode or a connection signal line.

A first electrode S1, a channel part A1, and a second electrode D1 of the first transistor T1 are formed from the first semiconductor pattern. The first electrode S1 and the second electrode D1 of the first transistor T1 extend in opposite directions from the channel part A1.

A portion of a connection signal line CSL formed from the first semiconductor pattern is illustrated in FIG. 6. Although not illustrated separately, the connection signal line CSL may be electrically connected to the second electrode of the sixth transistor T6 (see FIG. 5) on a plane.

The first insulating layer 10 may be disposed on the buffer layer BFL. The first insulating layer 10 may overlap a plurality of pixels in common and may cover the first semiconductor pattern. The first insulating layer 10 may be an inorganic layer or an organic layer, and may have a single layer or multi-layer structure. The first insulating layer 10 may include at least one of an aluminum oxide, a titanium oxide, a silicon oxide, silicon nitride, a silicon oxynitride, a zirconium oxide, and a hafnium oxide. In an embodiment, the first insulating layer 10 may be a silicon oxide layer having a single layer structure. An insulating layer of the circuit layer DP_CL, which is to be described later, as well as the first insulating layer 10 may be an inorganic layer or an organic layer, and may have a single layer structure or a multi-layer structure. The inorganic layer may include at least one of the above-described materials, but is not limited thereto.

A gate electrode G1 of the first transistor T1 is disposed on the first insulating layer 10. The gate electrode G1 may be a portion of a metal pattern. The gate electrode G1 of the first transistor T1 overlaps the channel part A1 of the first transistor T1. In a process of doping the first semiconductor pattern, the gate electrode G1 of the first transistor T1 may function as a mask. The gate electrode G1 may include, but is not limited to, titanium (Ti), silver (Ag), an alloy containing silver (Ag), molybdenum (Mo), an alloy containing molybdenum (Mo), aluminum (Al), an alloy containing aluminum (Al), an aluminum nitride (AlN), tungsten (W), a tungsten nitride (WN), copper (Cu), indium tin oxide (ITO), indium zinc oxide (IZO), or the like.

A second insulating layer 20 may be disposed on the first insulating layer 10 and may cover the gate electrode G1 of the first transistor T1. The second insulating layer 20 may be an inorganic layer or an organic layer, and may have a single layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

An upper electrode UE and a second back metal layer BMC2 may be disposed on the second insulating layer 20. The upper electrode UE may overlap the gate electrode G1. The upper electrode UE may be a portion of a metal pattern. A portion of the gate electrode G1 and the upper electrode UE overlapping the portion of the third electrode G1 may define the capacitor Cst (see FIG. 5). In an embodiment of the present disclosure, the second insulating layer 20 may be replaced with an insulating pattern. In this case, the upper electrode UE may be disposed on an insulating pattern, and the upper electrode UE may serve as a mask for forming an insulating pattern from the second insulating layer 20.

The second back metal layer BMC2 may be disposed to correspond to a lower portion of an oxide thin film transistor (e.g., the third transistor T3). The second back metal layer BMC2 may receive a constant voltage or a signal.

A third insulating layer 30 may be disposed on the second insulating layer 20 and may cover the upper electrode UE and the second back metal layer BMC2. The third insulating layer 30 may have a single layer or multi-layer structure. For example, the third insulating layer 30 may have a multi-layer structure including a silicon oxide layer and a silicon nitride layer.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially serves as a source/drain area of a transistor or a signal line. The non-reduction area substantially corresponds to an active area (alternatively, a semiconductor area or a channel) of the transistor. In other words, a part of the second semiconductor pattern may be the active area of the transistor; another part thereof may be the source/drain area of the transistor; and the other part thereof may be a signal transmission area.

A first electrode S3, a channel part A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may extend in directions opposite to each other from the channel part A3 on a cross section.

The fourth insulating layer 40 may be disposed on the third insulating layer 30. The fourth insulating layer 40 may overlap a plurality of pixels in common and may cover the second semiconductor pattern. The fourth insulating layer 40 may include at least one of an aluminum oxide, a titanium oxide, a silicon oxide, silicon nitride, a silicon oxynitride, a zirconium oxide, and a hafnium oxide.

A gate electrode G3 of the third transistor T3 is disposed on the fourth insulating layer 40. The gate electrode G3 may be a portion of a metal pattern. The gate electrode G3 of the third transistor T3 overlaps the channel part A3 of the third transistor T3. The gate electrode G3 may function as a mask in a process of doping the second semiconductor pattern. In an embodiment of the present disclosure, the fourth insulating layer 40 may be replaced with an insulating pattern.

The fifth insulating layer 50 may be disposed on the fourth insulating layer 40 and may cover the gate electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

The sixth insulating layer 60 may be disposed on the fifth insulating layer 50. The sixth insulating layer 60 may be an organic layer. The organic layer may include general purpose polymers such as benzocyclobutene (BCB), polyimide, hexamethyldisiloxane (HMDSO), polymethylmethacrylate (PMMA) or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and the blend thereof, but is not particularly limited thereto.

A second connection electrode CNE20 may be disposed on the fifth insulating layer 60. The second connection electrode CNE20 may be connected to the first connection electrode CNE10 through a second contact hole CH2 penetrating the sixth insulating layer 60. The seventh insulating layer 70 may be disposed on the sixth insulating layer 60 and may cover the second connection electrode CNE20. The seventh insulating layer 70 may be an organic layer.

A first electrode layer is disposed on the circuit layer DP_CL. A pixel defining layer PDL is formed on the first electrode layer. The first electrode layer may include an anode AE of the light emitting element ED and an anode AE1 of the light sensing element OPD. The anode AE of the light emitting element ED and the anode AE1 of the light sensing element OPD are disposed on the seventh insulating layer 70. The anode AE of the light emitting element ED may be connected to the second connection electrode CNE20 through a third contact hole CH3 penetrating the seventh insulating layer 70.

First and second film openings PDL-OP1 and PDL-OP2 are provided on the pixel defining layer PDL. The first film opening PDL-OP1 exposes at least part of the anode AE of the light emitting element ED. The second film opening PDL-OP2 exposes at least part of the anode AE1 of the light sensing element OPD.

In an embodiment of the present disclosure, the pixel defining layer PDL may further include a black material. The pixel defining layer PDL may further include a black organic dye/pigment such as carbon black, aniline black, or the like. The pixel defining layer PDL may be formed by mixing a blue organic material and a black organic material. The pixel defining layer PDL may further include a liquid-repellent organic material.

As shown in FIG. 6, the display panel DP may include an emission area PXA and a non-emission area NPXA-R adjacent to the emission area PXA. The non-emission area NPXA may surround the emission area PXA. In an embodiment, the emission area PXA is defined to correspond to a partial area of the anode AE exposed by the first film opening PDL-OP1.

The light emitting layer EL may be disposed on the anode AE of the light emitting element ED. The light emitting layer EL may be disposed in an area corresponding to the first film opening PDL-OP1. The light emitting layer EM may generate a predetermined colored light. In an embodiment, the patterned light emitting layer is described. However, one light emitting layer may be commonly disposed in a plurality of emission areas. At this time, the light emitting layer may generate white light or blue light. Also, the light emitting layer may have a multi-layer structure that is referred to as "tandem".

The light emitting layer EL may include a low-molecular organic material or a high-molecular organic material as a light emitting material. Alternatively, the light emitting layer EL may include a quantum dot material as a light emitting material. The core of a quantum dot may be selected from a group II-VI compound, a group III-V compound, a group IV-VI compound, a group IV element, a group IV compound, and a combination thereof.

A cathode CE is disposed on the light emitting layer EM. As an example of the present disclosure, the cathode CE may be commonly disposed in the emission area PXA, the non-emission area NPXA-R, and a non-pixel area NPA.

The circuit layer DP_CL may further include the sensor driving circuit SDC (see FIG. 5). For convenience of description, the reset transistor ST1 of the sensor driving circuit SDC is shown. A first electrode STS1, a channel part STA1, and a second electrode STD1 of the reset transistor ST1 are formed from the second semiconductor pattern. The first electrode STS1 and the second electrode STD1 include a metal reduced from a metal oxide semiconductor. The fourth insulating layer 40 is disposed to cover the first electrode STS1, the channel part STA1, and the second electrode STD1 of the reset transistor ST1. A gate electrode STG1 of the reset transistor ST1 is disposed on the fourth insulating layer 40. In an embodiment, the gate electrode STG1 may be a part of the metal pattern. The gate electrode STG1 of the reset transistor ST1 overlaps the channel part STA1 of the reset transistor ST1.

In an embodiment of the present disclosure, the reset transistor ST1 may be disposed on the same layer as the third transistor T3. That is, the first electrode STS1, the channel part STA1, and the second electrode STD1 of the reset transistor ST1 may be formed through a process the same as the first electrode S3, the channel part A3, and the second electrode D3 of the third transistor T3. The third electrode STG1 of the reset transistor ST1 may be simultaneously formed through the same process as the gate electrode G3 of the third transistor T3. Although not illustrated separately, the first electrode and the second electrode of each of the amplification transistor ST2 and the output transistor ST3 of the sensor driving circuit SDC may be formed through the same process as the first electrode S1 and the second electrode D1 of the first transistor T1. The reset transistor ST1 may be formed on the same layer as the third transistor T3 through the same process, and the amplification transistor ST2 and the output transistor ST3 may be formed on the same layer as the first transistor T1 through the same process. Accordingly, because an additional process for forming the reset transistor ST1, the amplification transistor ST2, and the output transistor ST3 is not required, process efficiency and cost may be reduced.

The element layer DP_ED may further include the light sensing element OPD.

The light sensing element OPD may include the anode AE1, a photoelectric conversion layer RL, and a cathode CE. The anode AE1 of the light sensing element OPD may be disposed on the same layer as the anode AE of the light emitting element ED. That is, the anode AE1 may be disposed on the circuit layer DP_CL and may be formed simultaneously with the anode AE of the light emitting element ED through the same process.

The second film opening PDL-OP2 of the pixel defining layer PDL exposes at least part of the anode AE1. The photoelectric conversion layer RL is disposed on the anode AE1 exposed by the second film opening PDL-OP2. The photoelectric conversion layer RL may include an organic photo-sensing material. The cathode CE may be disposed on the photoelectric conversion layer RL. Each of the anode AE1 and the cathode CE may receive an electrical signal. The anode AE1 and the cathode CE may receive different signals. Accordingly, a predetermined electric field may be formed between the anode AE1 and the cathode CE. The photoelectric conversion layer RL generates an electrical signal corresponding to the light incident on a sensor.

The charges generated by the photoelectric conversion layer RL change an electric field between the anode AE1 and the cathode CE. The amount of charge generated by the photoelectric conversion layer RL may vary depending on whether light is incident onto the light sensing element OPD, the amount of light incident onto the light sensing element OPD, and the intensity of light incident onto the light sensing element OPD. Accordingly, the electric field formed between the anode AE1 and the cathode CE may be changed. The light sensing element OPD according to an embodiment of the present disclosure may obtain fingerprint information of a user through a change in the electric field between the anode AE1 and the cathode CE.

The encapsulation layer TFE is disposed on the element layer DP_ED. The encapsulation layer TFE includes at least one inorganic layer or at least one organic layer. In an embodiment of the present disclosure, the encapsulation layer TFE may include two inorganic layers and an organic layer disposed therebetween. In an embodiment of the present disclosure, a thin film encapsulation layer may include a plurality of inorganic layers and a plurality of organic layers, which are alternately stacked.

The encapsulation inorganic layer protects the light emitting element ED and the light receiving element OPD from moisture/oxygen, and the encapsulation organic layer protects the light emitting element ED and the light receiving element OPD from foreign substances. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, and is not specifically limited thereto.

Figure 7:
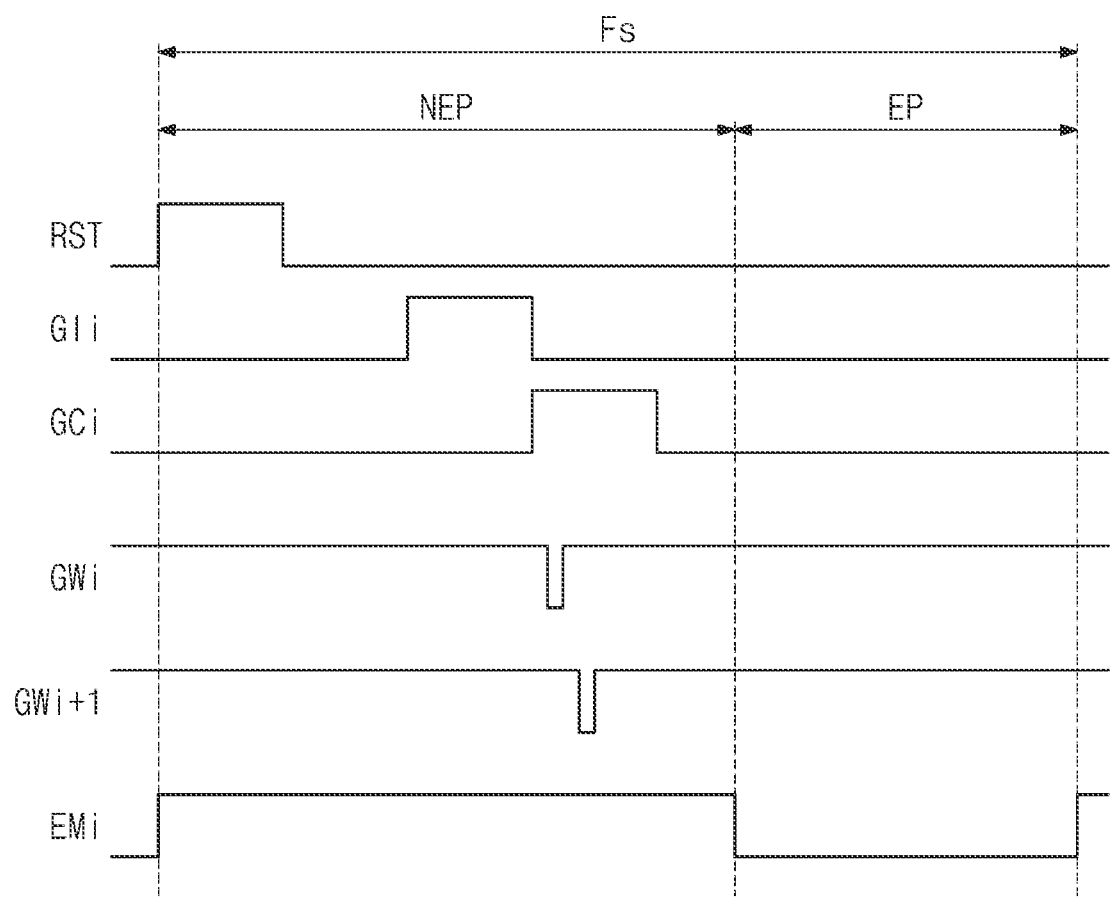
FIG. 7 is a timing diagram for describing an operation of the pixel and the sensor shown in FIG. 5.

FIG. 7 is a timing diagram for describing an operation of the pixel and the sensor shown in FIG. 5.

Referring to FIGS. 5 and 7, one frame Fs may include an emission period EP and a non-emission period NEP depending on an operation of the pixel PXij. The emission period EP may correspond to a low-level period (i.e., an active period) of the emission control signal EMi. The non-emission period NEP may correspond to a high-level period (i.e., an inactive period) of the emission control signal EMi.

The non-emission period NEP may include an initialization period and a data programming and compensation period.

When the scan signal Gli having a high level is provided through the scan line GILi during the initialization period, the fourth transistor T4 is turned on. The second initialization voltage VINT2 is delivered to the gate electrode of the first transistor T1 through the fourth transistor T4 so as to initialize the first transistor T1.

Next, when the scan signal GCi having a high level is supplied through the scan line GCLi during the data programming and compensation period, the third transistor T3 is turned on. The first transistor T1 is diode-connected by the third transistor T3 thus turned on to be forward-biased. At this time, when the scan signal GWi having a low level is supplied through the scan line GWLi, the second transistor T2 is turned on. In the case, a compensation voltage, which is obtained by reducing the voltage of the data signal Dj supplied from the data line DLj by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite ends of the capacitor Cst, charges corresponding to a difference between the first driving voltage ELVDD and the compensation voltage may be stored in the capacitor Cst.

In the meantime, the seventh transistor T7 is turned on when the scan signal GWi+1 received through the scan line GWLi+1 is at a low level. The anode of the light emitting element ED may be initialized to the first initialization voltage VINT1 by the seventh transistor T7.

Next, during the emission period EP, the emission control signal EMi supplied from the emission line EMLj is changed from a high level to a low level. During the emission period EP, the fifth transistor T5 and the sixth transistor T6 are turned on by the emission control signal EMi having a low level. In this case, a driving current Ied (see FIG. 5) according to a voltage difference between the gate voltage of the gate electrode of the first transistor T1 and the first driving voltage ELVDD is generated and supplied to the light emitting element ED through the sixth transistor T6, and the current flows through the light emitting element ED.

When the reset signal RST transitions to a high level, the reset transistor ST1 may be turned on such that the first sensing node SN1 is initialized to the reset voltage VRST.

A light exposure period of the sensor FXik may correspond to the emission period EP of the pixel PXij. During the emission period EP, the emission control signal EMi is maintained at a low level. The light sensing element OPD is exposed to light during the emission period EP. The light may be light output from the light emitting element ED of the pixel PXij.

When a user's hand touches a display surface, the light sensing element OPD may generate photocharges corresponding to light reflected by a ridge of a fingerprint or a valley between ridges of the fingerprint, and the generated photocharges may be accumulated in the first sensing node SN1.

The amplification transistor ST2 may be a source follower amplifier that generates a source-drain current in proportion to a charge amount of the first sensing node SN1 input to the gate electrode of the amplification transistor ST2.

While the scan signal GWi is at an inactive level, that is, a high level, the output transistor ST3 is turned off. When the scan signal GWi transitions to an active level, that is, a low level, the output transistor ST3 is turned on. When the output transistor ST3 is turned on, the sensing signal FSk corresponding to a current flowing through the amplification transistor ST2 may be output to the readout line RLk.

As such, the display panel DP may include the pixel PXij and the sensor FXik. The sensor FXik may be driven by using the scan signal GWi for driving the pixel PXij. In detail, the scan signal GWi supplied to the second transistor T2 of the pixel PXij may be supplied to the output transistor ST3 of the sensor FXik. Accordingly, a separate signal wire or circuit required to drive the sensor FXik is unnecessary, thereby minimizing or preventing a reduction in an aperture ratio even though the sensor FXik is disposed on the display panel DP.

Figure 8:
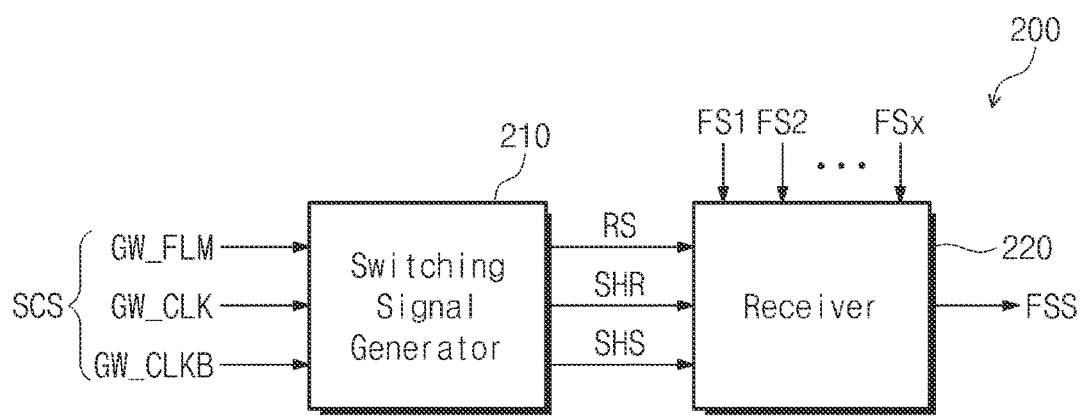
FIG. 8 is a block diagram of a readout circuit, according to an embodiment of the present disclosure.

FIG. 8 is a block diagram of the readout circuit 200, according to an embodiment of the present disclosure.

Referring to FIG. 8, the readout circuit 200 includes a switching signal generator 210 and a receiver 220.

The switching signal generator 210 receives the scan control signal SCS. The scan control signal SCS may include a scan start signal GW_FLM, a first clock signal GW_CLK, and a second clock signal GW_CLKB. The scan start signal GW_FLM, the first clock signal GW_CLK, and the second clock signal GW_CLKB may be signals used such that the scan driver 300 shown in FIG. 3 generates scan signals to be provided to the scan lines GWL1 to GWn+1.

The switching signal generator 210 outputs a first switching signal RS, a second switching signal SHR, and a third switching signal SHS based on the scan start signal GW_FLM, the first clock signal GW_CLK, and the second clock signal GW_CLKB.

The receiver 220 outputs a fingerprint sensing signal FSS corresponding to sensing signals FS1 to FSx in response to the first switching signal RS, the second switching signal SHR, and the third switching signal SHS.

Figure 9:
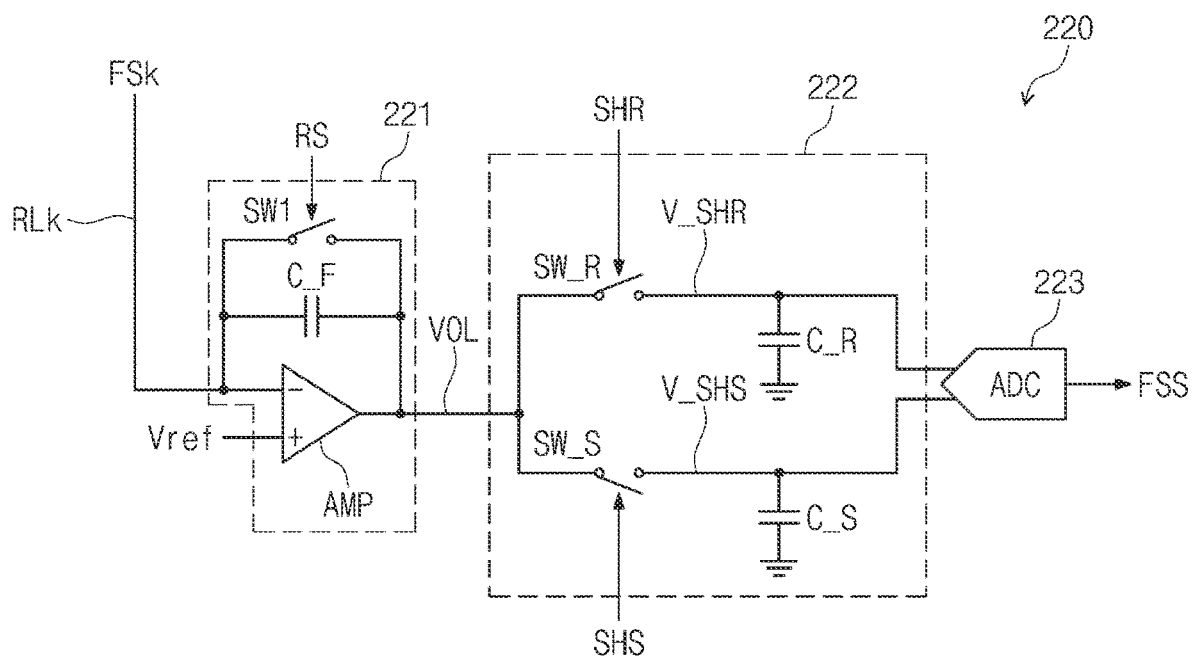
FIG. 9 is a diagram showing a circuit configuration of a receiver shown in FIG. 8.

FIG. 9 is a diagram showing a circuit configuration of the receiver 220 shown in FIG. 8.

FIG. 9 shows only a circuit related to receiving a k-th sensing signal FSk among the sensing signals FS1 to FSx among the circuits of the receiver 220.

Referring to FIG. 9, the receiver 220 may include a sensing circuit 221, a sample and hold circuit 222, and an analog-to-digital converter 223.

The sensing circuit 221 includes an operational amplifier AMP, a capacitor C_F, and a switch SW1. A reference voltage Vref may be input to a non-inverting input terminal (+) of the operational amplifier AMP, and the readout line RLk may be connected to an inverting input terminal (−) of the operational amplifier AMP. That is, the sensing signal FSk may be provided to the inverting input terminal (−) of the operational amplifier AMP. The capacitor C_F may be connected between the inverting input terminal (−) of the operational amplifier AMP and an output terminal VOL of the operational amplifier AMP, and the switch SW1 may be connected in parallel to the capacitor C_F.

The sample and hold circuit 222 may include a first switch SW_R, a first capacitor C_R, a second switch SW_S, and a second capacitor C_S. The first switch SW_R and the first capacitor C_R may be referred to as a "first sampling circuit". The second switch SW_S and the second capacitor C_S may be referred to as a "second sampling circuit".

Figure 10:
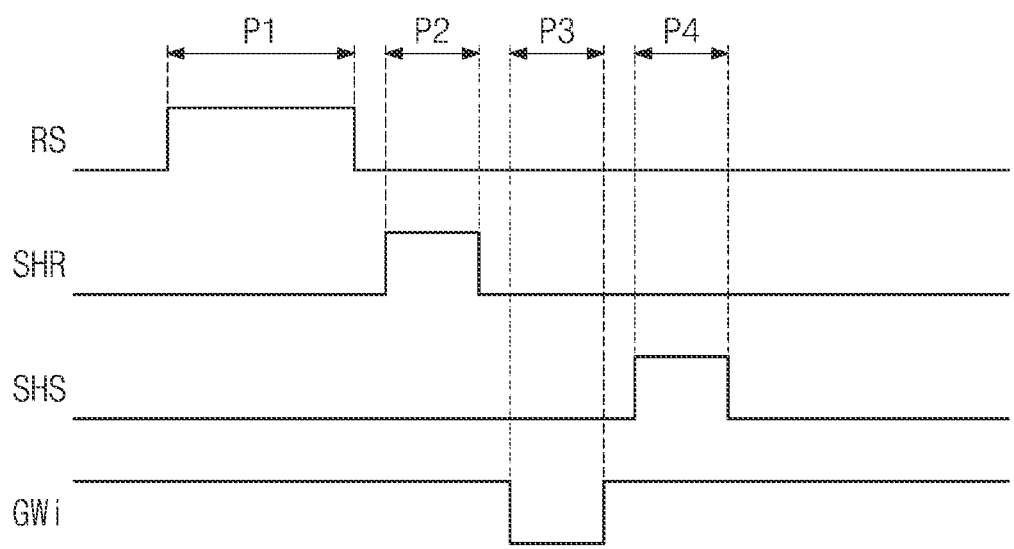
FIG. 10 is a timing diagram for describing an operation of a receiver shown in FIG. 9.

FIG. 10 is a timing diagram for describing an operation of the receiver 220 shown in FIG. 9.

Referring to FIGS. 9 and 10, when the first switching signal RS is at a high level during a first period P1, the switch SW1 is turned on. As the switch SW1 is turned on, the readout line RLk is electrically connected to an output terminal VOL of the operational amplifier AMP. Accordingly, the capacitor C_F may be initialized. When the first switching signal RS transitions to a low level, the sensing circuit 221 may operate as an integrator.

When the second switching signal SHR is at a high level during a second period P2, the first switch SW_R is turned on. As the first switch SW_R is turned on, the first capacitor C_R is charged with the voltage of the output terminal VOL of the sensing circuit 221. For example, the first switch SW_R may be turned on at a timing at which the sensing signal FS1 does not flow to the first readout line RL1. Accordingly, the first capacitor C_R may be charged with a first sampling signal V_SHR corresponding to noise.

When the scan signal GWi transitions to a low level during a third period P3, the output transistor ST3 shown in FIG. 5 is turned on. Accordingly, a current of the second sensing node SN2 may be delivered to the readout line RLk as the sensing signal FSk through the output transistor ST3. At this time, because the first switching signal RS is at a low level, the capacitor C_F may be charged with the sensing signal FSk of the readout line RLk.

When the second switch SW_S is turned on during a fourth period P4, the second capacitor C_S is charged with the voltage of the output terminal VOL of the sensing circuit 221. Accordingly, the second sampling signal V_SHS corresponding to the sensing signal FSk may be charged in the second capacitor C_S.

The analog-to-digital converter 223 converts a difference (or a difference value) between the first sampling signal V_SHR of the first capacitor C_R and the second sampling signal V_SHS of the second capacitor C_S into a digital signal (or a digital code) and outputs the fingerprint sensing signal FSS. When the fingerprint sensing signal FSS is output by using the difference between the first sampling signal V_SHR and the second sampling signal V_SHS, noise included in the sensing signal FS1 may be removed, and the sensitivity of fingerprint detection (or sensing sensitivity) may be improved.

A period in time of each of the first to fourth periods P1 to P4 shown in FIG. 10 is only an example, and the present disclosure is not limited thereto. That is, a pulse width of each of the first to third switching signals RS, SHR, and SHS is not limited to the example shown in FIG. 10. For example, pulse widths of the first or third switching signals RS, SHR, and SHS may be the same as one another. Moreover, as needed, a pulse width of at least one of the second and third switching signals SHR and SHS may be longer than a pulse width of the scan signal GWi. Assuming that the pulse width of the scan signal GWi is 1 horizontal period, the pulse width of at least one of the second and third switching signals SHR and SHS may be longer than 1 horizontal period.

Figure 11:
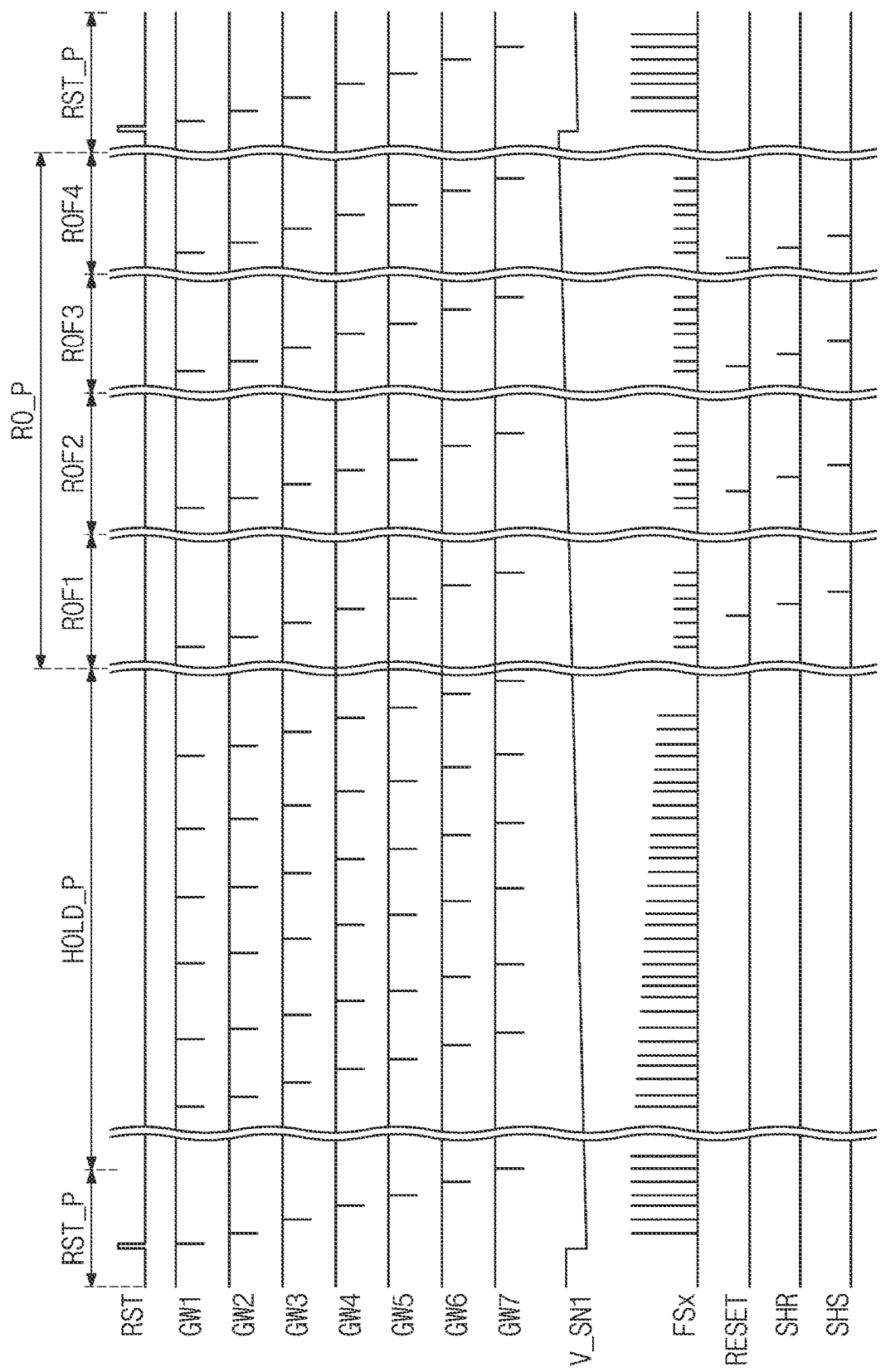
FIG. 11 is a timing diagram for describing an embodiment of an operation of a display device.

FIG. 11 is a timing diagram for describing an embodiment of an operation of a display device.

Referring to FIGS. 3, 5, 9, and 11, the reset signal RST and the scan signals GW1 to GW7 are provided to the pixels PX and the sensors FX. The voltage V_SN1 may be a voltage of the first sensing node SN1 in the sensor FXik. The sensing signal FS represents a single signal by overlapping the plurality of the sensing signals FS1 to FSx from the sensors FX. The voltage V_SN1 and the sensing signal FS are only one example for understanding of the description, but the present disclosure is not limited thereto.

When the reset signal RST is at a high level during a reset period RST_P, the reset transistor ST1 in the sensor FXik may be turned on and thus the first sensing node SN1 may be initialized to the reset voltage VRST. In an embodiment, the reset period RST_P may correspond to one frame.

During a hold period HOLD_P, the pixels PX may operate in response to the scan signals GW1 to GW7. In an embodiment, the hold period HOLD_P may correspond to a plurality of frames (e.g., 10 frames).

As the scan signals GW1 to GW7 are sequentially activated at a low level during the hold period HOLD_P, the sensing signal FS may be output. For example, each of the pulses of the sensing signal FS may correspond to timing at which each of the scan signals GW1 to GW7 is activated at a low level.

During the hold period HOLD_P, the light sensing element OPD may be exposed to external light, and thus a voltage V_SN1 of the first sensing node SN1 in the sensor FXik may gradually rise. As the voltage V_SN1 of the first sensing node SN1 gradually increases, the voltage level of the sensing signal FSx may gradually decrease.

During a readout period RO_P, the readout circuit 200 may receive the sensing signal FS, and may output the fingerprint sensing signal FSS.

The readout period RO_P may include a plurality of readout frames. In the example shown in FIG. 11, the readout period RO_P includes first to fourth readout frames ROF1 to ROF4. The number of readout frames included in the readout period RO_P is not limited to four and may be changed in various manners.

During each of the first to fourth readout frames ROF1 to ROF4, the first to third switching signals RS, SHR, and SHS may sequentially transition to a high level.

Figure 12:
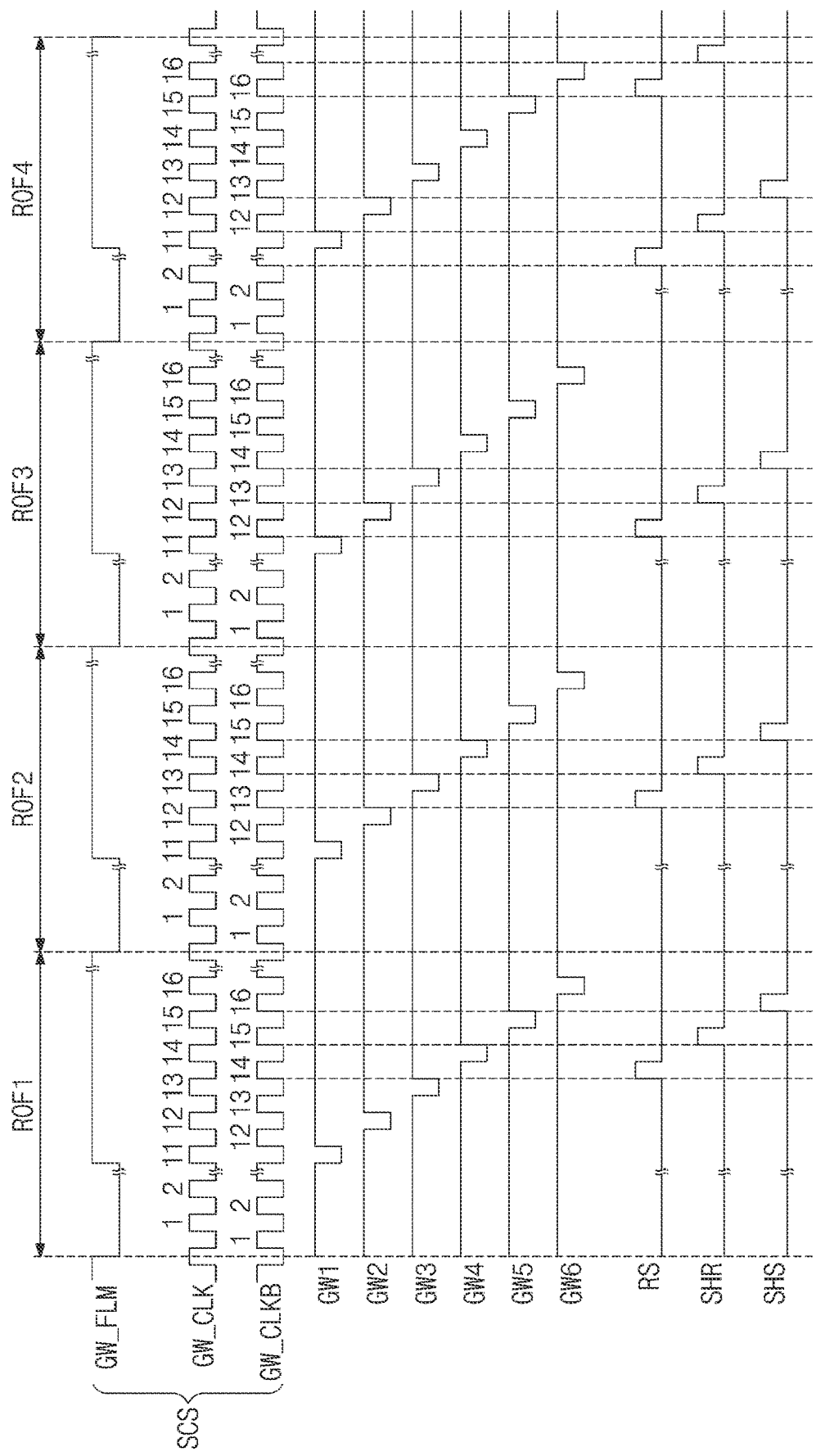
FIG. 12 is a diagram showing first to third switching signals during each of the first to fourth readout frames.

FIG. 12 is a diagram showing the first to third switching signals RS, SHR, and SHS during each of the first to fourth readout frames ROF1 to ROF4.

Referring to FIGS. 8, 9, and 12, the switching signal generator 210 may output the first switching signal RS, the second switching signal SHR, and the third switching signal SHS based on the scan start signal GW_FLM, the first clock signal GW_CLK, and the second clock signal GW_CLKB, which are included in the scan control signal SCS.

After the scan start signal GW_FLM transitions from a high level to a low level, the scan driver 300 shown in FIG. 3 may sequentially output the scan signals GW1 to GW6 at a low level from an eleventh pulse of the first clock signal GW_CLK.

After the scan start signal GW_FLM transitions from a high level (or a first level) to a low level (or a second level) during each of the first to fourth readout frames ROF1 to ROF4, the switching signal generator 210 may sequentially output the first or third switching signals RS. SHR, and SHS at an active level (e.g., a high level) from a p-th pulse (p is a positive integer) of the second clock signal GW_CLKB. During each of the first to fourth readout frames ROF1 to ROF4, the p-th pulse of the second clock signal GW_CLKB may be different.

After the scan start signal GW_FLM transitions from the high level (or a first level) to the low level (or a second level) during the first readout frame ROF1, the switching signal generator 210 may sequentially output the first or third switching signals RS, SHR, and SHS at a high level from a fourteenth pulse of the second clock signal GW_CLKB. That is, during the fourteenth pulse of the second clock signal GW_CLKB, the first switching signal RS may be activated at a high level; during a fifteenth pulse of the second clock signal GW_CLKB, the second switching signal SHR may be activated at a high level; and, during a sixteenth pulse of the second clock signal GW_CLKB, the third switching signal SHS may be activated at a high level.

After the scan start signal GW_FLM transitions from the high level to the low level during the second readout frame ROF2, the switching signal generator 210 may sequentially output the first or third switching signals RS, SHR, and SHS at a high level from a thirteenth pulse of the second clock signal GW_CLKB. That is, during the thirteenth pulse of the second clock signal GW_CLKB, the first switching signal RS may be activated at a high level; during the fourteenth pulse of the second clock signal GW_CLKB, the second switching signal SHR may be activated at a high level; and, during the fifteenth pulse of the second clock signal GW_CLKB, the third switching signal SHS may be activated at a high level.

After the scan start signal GW_FLM transitions from the high level to the low level during the third readout frame ROF3, the switching signal generator 210 may sequentially output the first or third switching signals RS, SHR, and SHS at a high level from a twelfth pulse of the second clock signal GW_CLKB. That is, during the twelfth pulse of the second clock signal GW_CLKB, the first switching signal RS may be activated at a high level; during the thirteenth pulse of the second clock signal GW_CLKB, the second switching signal SHR may be activated at a high level; and, during the fourteenth pulse of the second clock signal GW_CLKB, the third switching signal SHS may be activated at a high level.

After the scan start signal GW_FLM transitions from the high level to the low level during the fourth readout frame ROF4, the switching signal generator 210 may sequentially output the first or third switching signals RS. SHR, and SHS at a high level from the eleventh pulse of the second clock signal GW_CLKB. That is, during the eleventh pulse of the second clock signal GW_CLKB, the first switching signal RS may be activated at a high level; during the twelfth pulse of the second clock signal GW_CLKB, the second switching signal SHR may be activated at a high level; and, during the thirteenth pulse of the second clock signal GW_CLKB, the third switching signal SHS may be activated at a high level.

In the example shown in FIG. 12, during each of the first to fourth readout frames ROF1 to ROF4, the first switching signal RS is activated at a high level at different timings. The second switching signal SHR is activated at a high level at different timings during each of the first to fourth readout frames ROF1 to ROF4. The third switching signal SHS is activated to a high level at different timings during each of the first to fourth readout frames ROF1 to ROF4. In addition, the first to third switching signals RS, SHR, and SHS may be repeatedly activated at a high level every 4 pulses of the second clock signal GW_CLKB.

For example, during the first readout frame ROF1, the first switching signal RS may be activated at a high level during each of the fourteenth pulse, eighteenth pulse, and 22nd pulse of the second clock signal GW_CLKB; the second switching signal SHR may be activated at a high level during each of the fifteenth pulse, nineteenth pulse, and 23rd pulse of the second clock signal GW_CLKB; and, the third switching signal SHS may be activated at a high level during each of the sixteenth pulse, twentieth pulse, and 24th pulse of the second clock signal GW_CLKB.

For example, during the fourth readout frame ROF4, the first switching signal RS may be activated at a high level during the eleventh pulse, fifteenth pulse, and nineteenth pulse of the second clock signal GW_CLKB; the second switching signal SHR may be activated at a high level during the twelfth pulse, sixteenth pulse, and twentieth pulse of the second clock signal GW_CLKB; and, the third switching signal SHS may be activated at a high level during the thirteenth pulse, seventeenth pulse, and 21st pulse of the second clock signal GW_CLKB.

During the first to fourth readout frames ROF1 to ROF4, the readout circuit 200 may repeatedly receive the sensing signals FS1 to FSx. Accordingly, it is possible to secure enough time required to read out the sensing signals FS1 to FSx. Accordingly, fingerprint sensing sensitivity may be improved.

In particular, the readout circuit 200 may output the first switching signal RS, the second switching signal SHR, and the third switching signal SHS by receiving the scan control signal SCS provided from the panel driving circuit 100 to the scan driver 300. Accordingly, there is no need for separate wirings for signals required for an operation of the readout circuit 200.

Figure 13:
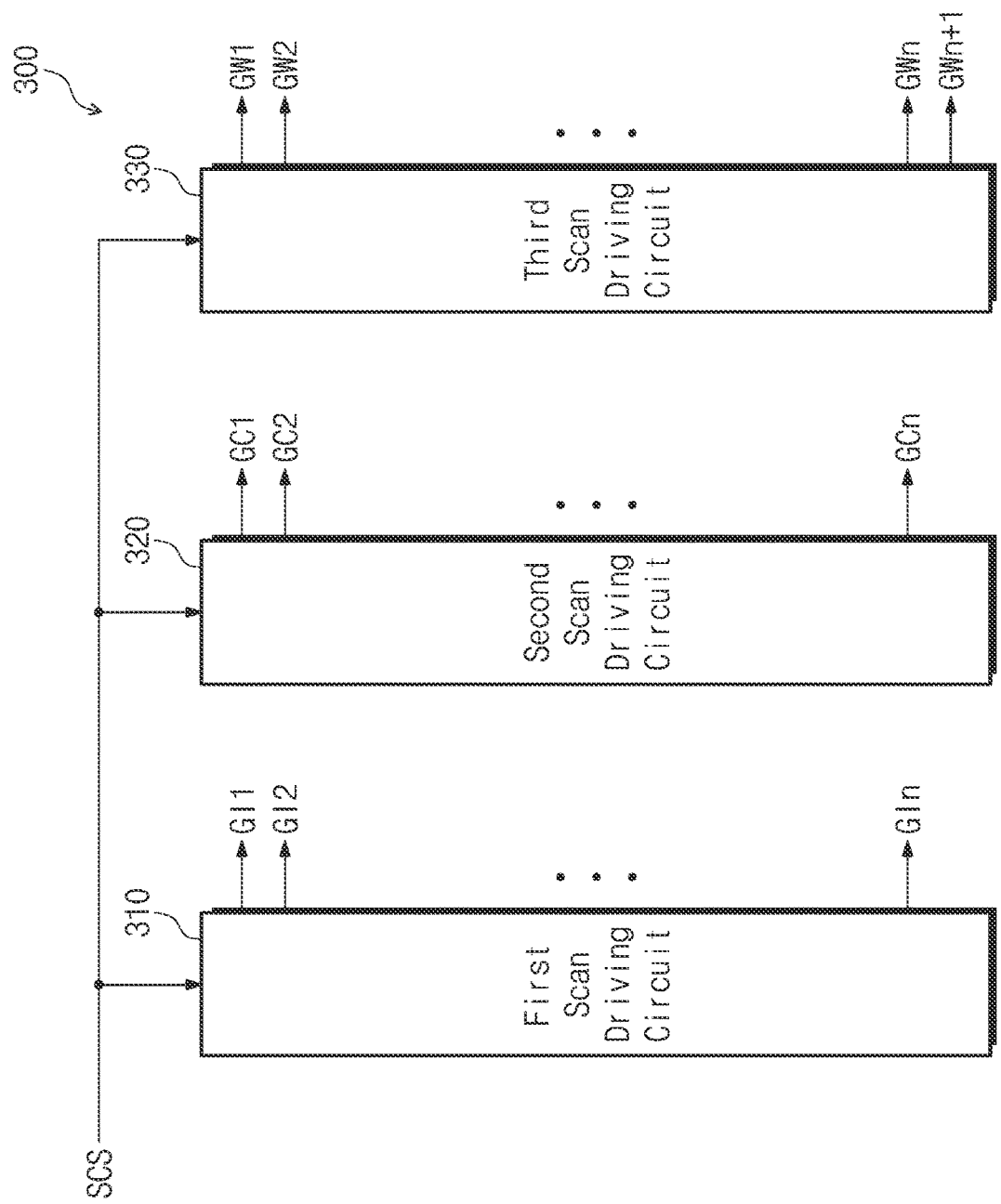
FIG. 13 is a block diagram showing a scan driver shown in FIG. 3.

FIG. 13 is a block diagram showing the scan driver 300.

Referring to FIGS. 3 and 13, the scan driver 300 includes a first scan driving circuit 310, a second scan driving circuit 320, and a third scan driving circuit 330.

The first scan driving circuit 310 outputs the scan signals GI1 to GIn to be provided to the scan lines GIL1 to GILn in response to the scan control signal SCS.

The second scan driving circuit 320 outputs the scan signals GC1 to GCn to be provided to the scan lines GCL1 to GCLn in response to the scan control signal SCS.

The third scan driving circuit 330 outputs the scan signals GW1 to GWn+1 to be provided to the scan lines GWL1 to GWLn+1 in response to the scan control signal SCS. In an embodiment, the scan control signal SCS may include the scan start signal GW_FLM, the first clock signal GW_CLK, and the second clock signal GW_CLKB.

In an embodiment, the third scan driving circuit 330 may output the scan signals GW1 to GWn+1 to be provided to the scan lines GWL1 to GWLn+1 based on the scan start signal GW_FLM, the first clock signal GW_CLK, and the second clock signal GW_CLKB.

Figure 14:
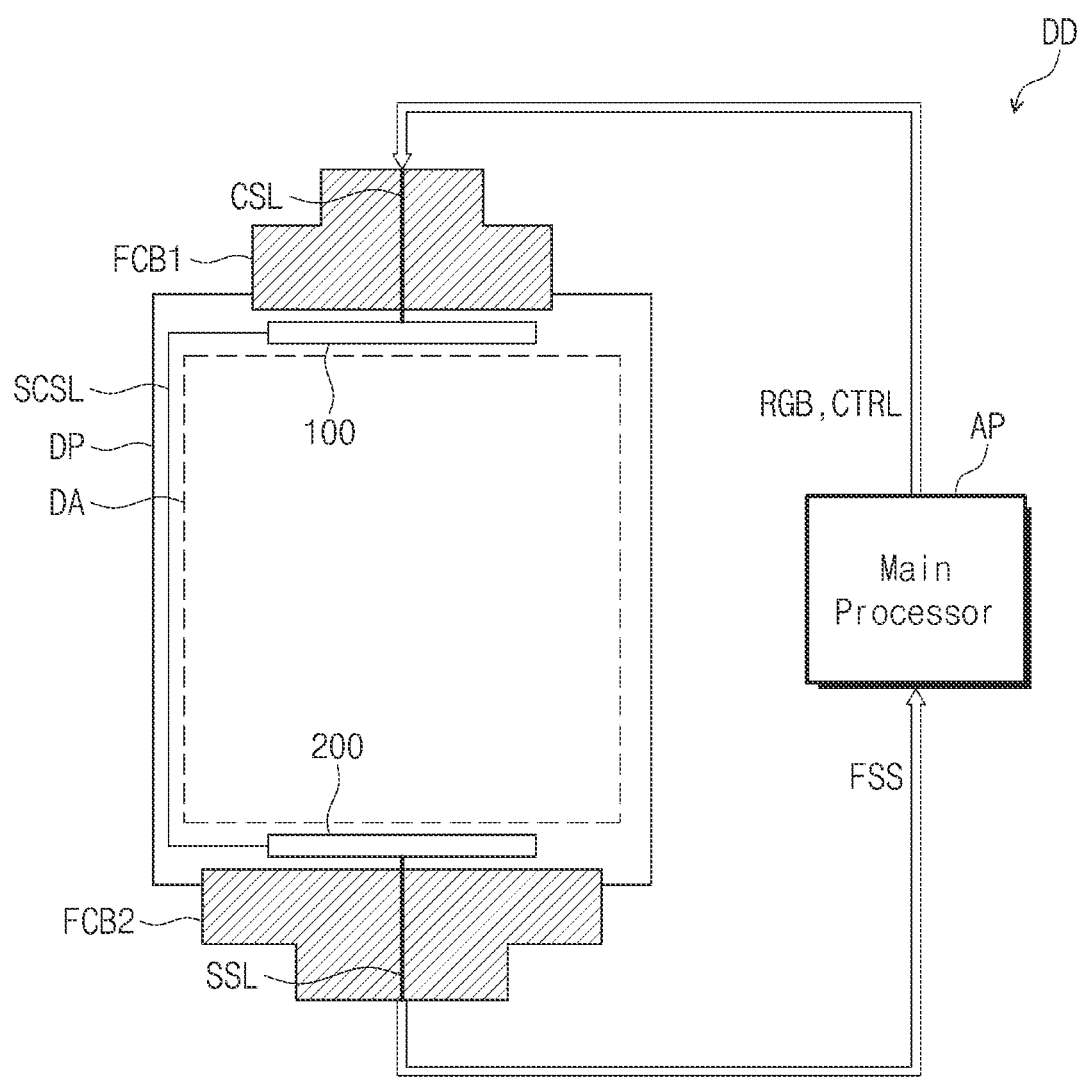
FIG. 14 is a block diagram of a display device, according to an embodiment.

FIG. 14 is a block diagram of a display device DD, according to an embodiment.

Referring to FIG. 14, the display device DD may include a main processor AP, a display panel DP, and flexible circuit boards FCB1 and FCB2. The main processor AP may be a processor such as a graphics processor, an application processor, a central processing unit (CPU), or a graphics processing unit (GPU).

The panel driving circuit 100 and the readout circuit 200 may be disposed on the display panel DP. The panel driving circuit 100 and the readout circuit 200 may face each other with the display area DA interposed therebetween.

In an embodiment, each of the panel driving circuit 100 and the readout circuit 200 may be implemented with an integrated circuit to be directly mounted on the display panel DP. However, the present disclosure is not limited thereto. In an embodiment, the panel driving circuit 100 and the readout circuit 200 may be mounted on the flexible circuit boards FCB1 and FCB2, respectively.

The panel driving circuit 100 and the readout circuit 200 may be electrically connected to the flexible circuit boards FCB1 and FCB2, respectively.

The main processor AP may be electrically connected to the flexible circuit boards FCB1 and FCB2. The image signal RGB and the control signal CTRL provided from the main processor AP may be delivered to the panel driving circuit 100 through a control signal wiring CSL of the flexible circuit board FCB1.

The fingerprint sensing signal FSS output from the readout circuit 200 may be delivered to the main processor AP through a sensing signal wiring SSL of the flexible circuit board FCB2.

In an embodiment, the readout circuit 200 may be electrically connected to the panel driving circuit 100 through the scan control line SCSL. The readout circuit 200 may receive the scan control signal SCS from the panel driving circuit 100 through the scan control line SCSL.

When the readout circuit 200 does not receive the scan control signal SCS from the panel driving circuit 100, the readout circuit 200 needs to receive signals for controlling an operation of the readout circuit 200 from the main processor AP.

In an embodiment of the present disclosure, because the readout circuit 200 receives the scan control signal SCS from the panel driving circuit 100, the readout circuit 200 does not need to receive a separate signal from the main processor AP.

Figure 15:
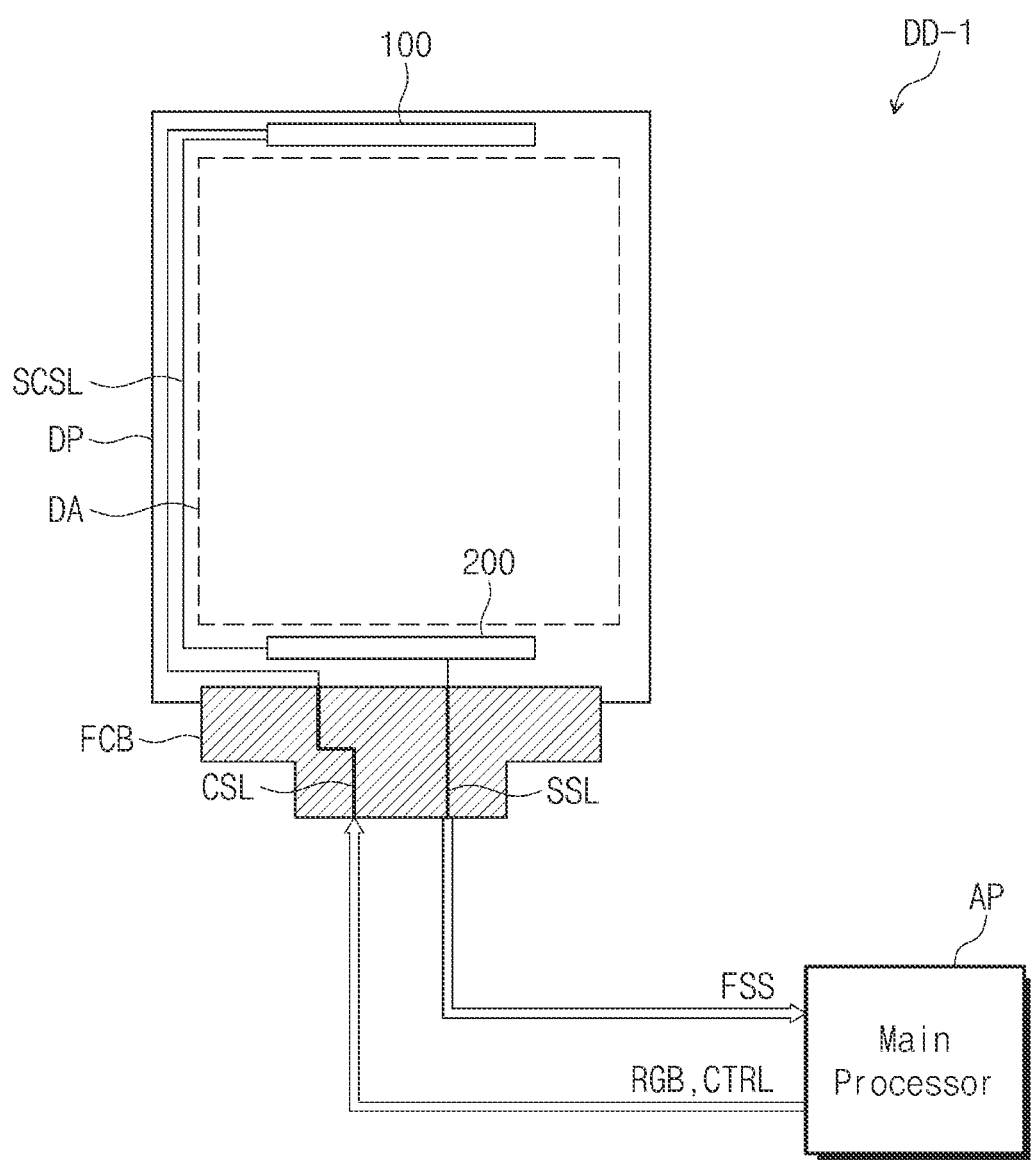
FIG. 15 is a block diagram of a display device, according to an embodiment.

FIG. 15 is a block diagram of a display device DD-1, according to an embodiment.

The display device DD-1 shown in FIG. 15 includes configurations similar to the display device DD shown in FIG. 14, and thus the same reference numerals are used for the same components, and additional descriptions are omitted to avoid redundancy.

The display device DD shown in FIG. 14 includes two flexible circuit boards FCB1 and FCB2 electrically connected to the panel driving circuit 100 and the readout circuit 200, respectively. The display device DD-1 shown in FIG. 15 includes only one flexible circuit board FCB.

Referring to FIG. 15, the panel driving circuit 100 and the readout circuit 200 may face each other with the display area DA interposed therebetween.

The image signal RGB and the control signal CTRL provided from the main processor AP may be delivered to the panel driving circuit 100 through control signal wiring CSL of the flexible circuit board FCB. The fingerprint sensing signal FSS output from the readout circuit 200 may be delivered to the main processor AP through the sensing signal wiring SSL of the flexible circuit board FCB.

The control signal wiring CSL for the panel driving circuit 100 and the sensing signal wiring SSL for the readout circuit 200 need to be positioned on the one flexible circuit board FCB. When signals for controlling an operation of the readout circuit 200 are provided from the main processor AP, the number of wirings to be positioned on the flexible circuit board FCB increases.

In an embodiment of the present disclosure, because the readout circuit 200 receives the scan control signal SCS from the panel driving circuit 100, the readout circuit 200 does not need to receive a separate signal from the main processor AP.

Figure 16:
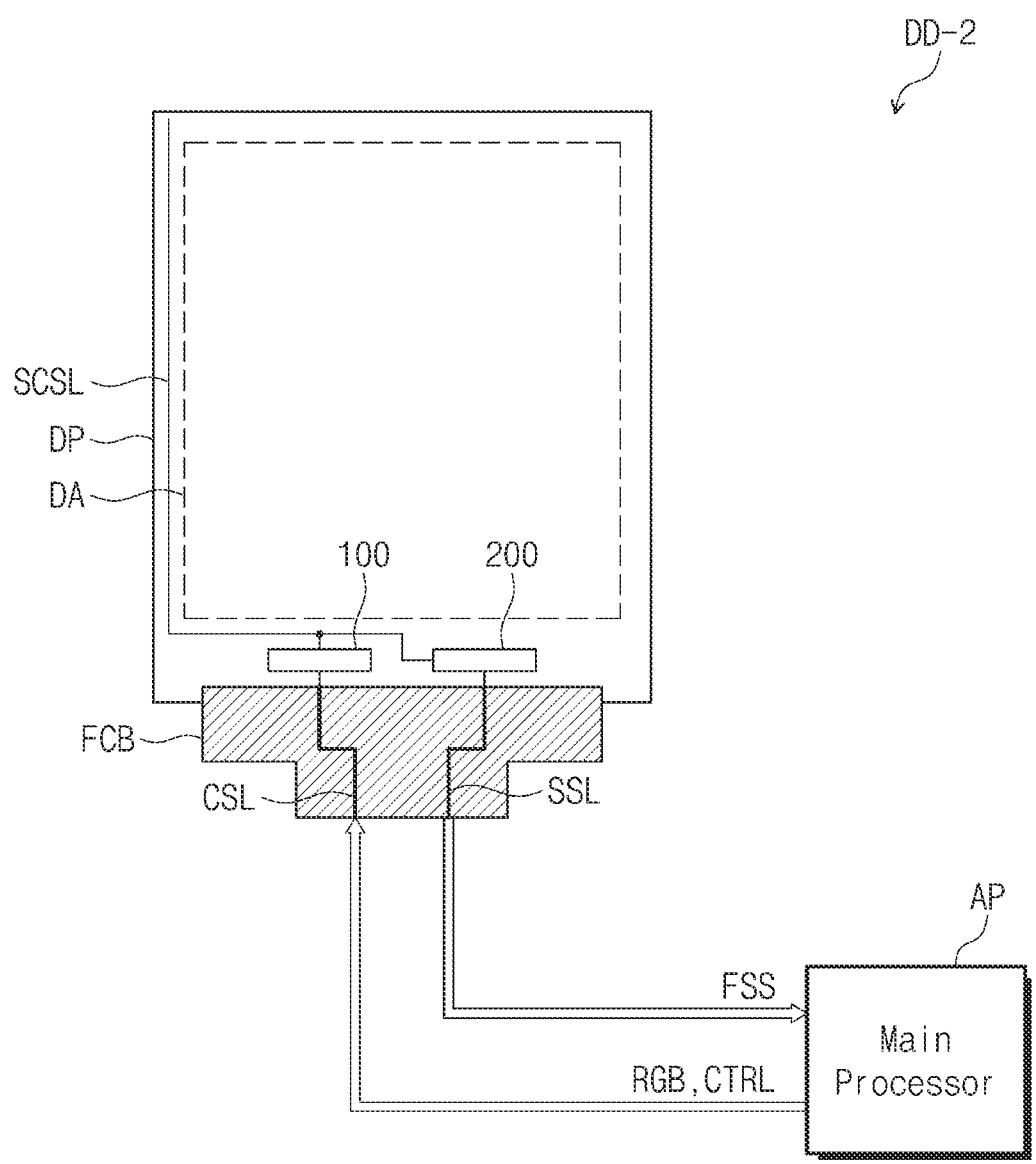
FIG. 16 is a block diagram of a display device, according to an embodiment.

FIG. 16 is a block diagram of a display device DD-2, according to an embodiment.

The display device DD-2 shown in FIG. 16 includes configurations similar to the display device DD shown in FIG. 14, and thus the same reference numerals are used for the same components, and additional descriptions are omitted to avoid redundancy.

The display device DD shown in FIG. 14 includes two flexible circuit boards FCB1 and FCB2 electrically connected to the panel driving circuit 100 and the readout circuit 200, respectively. The display device DD-2 shown in FIG. 16 includes only the one flexible circuit board FCB.

Referring to FIG. 16, the panel driving circuit 100 and the readout circuit 200 may be positioned side by side on one side of the display panel DP.

The image signal RGB and the control signal CTRL provided from the main processor AP may be delivered to the panel driving circuit 100 through the control signal wiring CSL of the flexible circuit board FCB. The fingerprint sensing signal FSS output from the readout circuit 200 may be delivered to the main processor AP through the sensing signal wiring SSL of the flexible circuit board FCB.

The control signal wiring CSL for the panel driving circuit 100 and the sensing signal wiring SSL for the readout circuit 200 need to be positioned on the one flexible circuit board FCB. When signals for controlling an operation of the readout circuit 200 are provided from the main processor AP, the number of wirings to be positioned on the flexible circuit board FCB increases.

In an embodiment of the present disclosure, because the readout circuit 200 receives the scan control signal SCS from the panel driving circuit 100, the readout circuit 200 does not need to receive a separate signal from the main processor AP.

A display device having such the configuration includes a sensor for detecting a user's fingerprint. A readout circuit electrically connected to the sensor may generate signals necessary to detect a fingerprint from the sensor by using signals for driving a display panel. Accordingly, it is possible to minimize the number of wires for transmitting signals necessary for an operation of the readout circuit.

Although embodiments of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

What is claimed is:

1. A display device comprising:
a display panel including a pixel that includes a light emitting element and a sensor that includes a light sensing element;
a scan driver configured to output a scan signal for driving the pixel and the sensor in response to a scan control signal;
a panel driving circuit configured to output the scan control signal; and
a readout circuit configured to generate switching signals based on the scan control signal and to output a fingerprint sensing signal corresponding to a sensing signal received from the sensor in response to the switching signals,
wherein the readout circuit includes:
a switching signal generator configured to generate the switching signals based on the scan control signal; and
a receiver configured to output the fingerprint sensing signal corresponding to the sensing signal received from the sensor in response to the switching signals,
wherein the scan control signal includes a scan start signal and a clock signal,
wherein, after the scan start signal transitions from a first level to a second level, the switching signal generator sequentially outputs the switching signals at an active level from a p-th pulse of the clock signal, and
wherein p is a positive integer.

2. The display device of claim 1, wherein the switching signals includes a first switching signal, a second switching signal, and a third switching signal, and
wherein the switching signal generator sequentially outputs the first switching signal, the second switching signal, and the third switching signal from the p-th pulse of the clock signal at the active level.

3. The display device of claim 2, wherein the receiver includes:
a sensing circuit configured to integrate the sensing signal received from the sensor in response to the first switching signal;
a first sampling circuit configured to sample an output of the sensing circuit in response to the second switching signal and to output a first sampling signal;
a second sampling circuit configured to sample the output of the sensing circuit in response to the third switching signal and to output a second sampling signal; and
an analog-to-digital converter configured to output a digital signal corresponding to a difference between the first sampling signal and the second sampling signal as the fingerprint sensing signal.

4. The display device of claim 1, wherein the sensor further includes a sensor driving circuit connected to the light sensing element and configured to output the sensing signal corresponding to external light.

5. The display device of claim 4, wherein the sensor driving circuit includes:
a reset transistor includes a first electrode for receiving a reset voltage, a second electrode connected to a first sensing node, and a gate electrode for receiving a reset signal;
an amplification transistor including a first electrode for receiving a driving voltage, a second electrode connected to a second sensing node, and a gate electrode connected to the first sensing node; and
an output transistor including a first electrode connected to the second sensing node, a second electrode connected to a readout line for outputting the sensing signal, and a gate electrode for receiving a scan signal.

6. The display device of claim 1, wherein the pixel further includes a pixel driving circuit configured to drive the light emitting element in response to at least one scan signal.

7. The display device of claim 6, wherein the pixel driving circuit includes:
a first transistor including a first electrode electrically connected to a first driving voltage line for receiving a first driving voltage, a second electrode electrically connected to the light emitting element, and a gate electrode;
a second transistor connected between a data line and the first electrode of the first transistor and including a gate electrode for receiving a first scan signal; and
a third transistor connected between the second electrode of the first transistor and the gate electrode of the first transistor and including a gate electrode for receiving a second scan signal.

8. The display device of claim 7, wherein the scan driver outputs the first scan signal and the second scan signal in response to the scan control signal.

9. The display device of claim 1, wherein the light emitting element is an organic light emitting diode, and
wherein the light sensing element is an organic photodiode.

10. A display device comprising:
a display panel including a pixel and a sensor;
a panel driving circuit configured to output a scan control signal;
a scan driver configured to output a scan signal for driving the pixel and the sensor in response to the scan control signal; and
a readout circuit configured to generate switching signals based on the scan control signal and to output a fingerprint sensing signal corresponding to a sensing signal received from the sensor in response to the switching signals,
wherein the pixel includes a light emitting element and a pixel driving circuit connected to the light emitting element and to drive the light emitting element in response to the scan signal,
wherein the sensor includes a light sensing element and a sensor driving circuit connected to the light sensing element and configured to output the sensing signal corresponding to external light in response to the scan signal,
wherein the scan control signal includes a scan start signal and a clock signal,
wherein the readout circuit includes:
a switching signal generator configured to generate the switching signals based on the scan start signal and the clock signal; and
a receiver configured to output the fingerprint sensing signal corresponding to the sensing signal received from the sensor in response to the switching signals,
wherein the switching signals includes a first switching signal, a second switching signal, and a third switching signal,
wherein, after the scan start signal transitions from a first level to a second level, the switching signal generator sequentially outputs the first switching signal, the second switching signal, and the third switching signal at an active level from a p-th pulse of the clock signal, and
wherein p is a positive integer.

11. The display device of claim 10, wherein the receiver includes:
a sensing circuit configured to integrate the sensing signal received from the sensor in response to the first switching signal;
a first sampling circuit configured to sample an output of the sensing circuit in response to the second switching signal and to output a first sampling signal;
a second sampling circuit configured to sample the output of the sensing circuit in response to the third switching signal and to output a second sampling signal; and
an analog-to-digital converter configured to output a digital signal corresponding to a difference between the first sampling signal and the second sampling signal as the fingerprint sensing signal.

12. A method of driving a display device, the method comprising:
generating a scan control signal;
generating a scan signal to be provided to a pixel and a sensor in response to the scan control signal;
outputting a sensing signal from the sensor in response to the scan signal;
generating switching signals in response to the scan control signal; and
converting the sensing signal output from the sensor into a fingerprint sensing signal in response to the switching signals,
wherein the scan control signal includes a scan start signal and a clock signal, and
wherein the generating of the switching signals in response to the scan control signal includes:
after the scan start signal transitions from a first level to a second level, sequentially outputting the switching signals at an active level from a p-th pulse of the clock signal, and
wherein p is a positive integer.

* * * * *